(12) United States Patent
Waite et al.

(10) Patent No.: US 12,718,196 B2
(45) Date of Patent: Aug. 25, 2026

(54) TOOL INVENTORY AND TRACKING SYSTEM

(71) Applicant: Parcell Company, Columbus, OH (US)

(72) Inventors: Erica L. Waite, Columbus, OH (US); James E. Mainord, Columbus, OH (US)

(73) Assignee: Parcell Company, Columbus, OH (US)

( * ) Notice: Subject to any disclaimer, the term of this patent is extended or adjusted under 35 U.S.C. 154(b) by 63 days.

(21) Appl. No.: 18/976,115

(22) Filed: Dec. 10, 2024

(65) Prior Publication Data

US 2025/0190939 A1 Jun. 12, 2025

Related U.S. Application Data

(60) Provisional application No. 63/608,571, filed on Dec. 11, 2023.

(51) Int. Cl.
*G06Q 10/087* (2023.01)
*G07C 9/27* (2020.01)
*G07C 9/28* (2020.01)

(52) U.S. Cl.
CPC ............. *G06Q 10/087* (2013.01); *G07C 9/27* (2020.01); *G07C 9/28* (2020.01)

(58) Field of Classification Search
CPC ........... G06Q 10/087; G07C 9/27; G07C 9/28
See application file for complete search history.

(56) References Cited

U.S. PATENT DOCUMENTS 7,630,791 B2 12/2009 Nguyen et al.
8,020,768 B2 9/2011 Ramos-Elizondo et al.
10,062,050 B2 8/2018 Lipsey et al.
10,579,873 B2 3/2020 Lipsey et al.
10,635,956 B2 4/2020 Mann et al.
(Continued)

FOREIGN PATENT DOCUMENTS

CN 111259893 A 6/2020

OTHER PUBLICATIONS

Smartbox, derived from web page <https://www.researchgate.net/Publication/2950654_The_Smart_Box_Concept_for_Ubiquitous_Computing_Environment>, Research Gate, The Smart Box Concept for Ubiquitous Computing Environments, Floerkemeier, et al. dated Jan. 15, 2024.
(Continued)

*Primary Examiner* — A. Hunter Wilder
*Assistant Examiner* — Joseph M Mutschler
(74) *Attorney, Agent, or Firm* — Thomas E. Lees, LLC

(57) ABSTRACT

Methods and systems are described for inventory management in scenarios like aircraft repair locations, hospitals, or other locations in need of tracking inventory. A central tool inventory or repository can be used to stock smart retainers and toolboxes. The smart retainers and toolboxes can each comprise a variety of receptacles for storing items, tools, supplies, vehicles, or other objects that a user desires to track and monitor. And each may comprise a computing device configured to detect and track the presence of all items stored within the respective smart retainer or toolbox. A user may only be able to check out those items necessary to complete an identified task. Machine learning may be used over time to better predict needs for certain tasks or to better predict the effects of wear and tear and other degradation.

9 Claims, 16 Drawing Sheets

(56) References Cited

U.S. PATENT DOCUMENTS

| | | | | |
|---|---|---|---|---|
| 10,656,614 | B2 | 5/2020 | Londo et al. | |
| 11,049,177 | B2 | 6/2021 | White et al. | |
| 11,293,630 | B2 | 4/2022 | Paul et al. | |
| 11,562,566 | B2 | 1/2023 | Lipsey et al. | |
| 11,655,102 | B2 | 5/2023 | Fly et al. | |
| 11,935,280 | B2 | 3/2024 | Aslandere et al. | |
| 2009/0005927 | A1 | 1/2009 | Schlatre et al. | |
| 2020/0184544 | A1 | 6/2020 | Roundtree et al. | |
| 2020/0410433 | A1* | 12/2020 | Rahilly | G06Q 20/40145 |
| 2020/0410434 | A1* | 12/2020 | Fly | H04N 7/181 |
| 2021/0263890 | A1 | 8/2021 | Lin | |
| 2021/0398248 | A1 | 12/2021 | Cox et al. | |
| 2022/0253793 | A1 | 8/2022 | Hill | |
| 2022/0309306 | A1 | 9/2022 | Henry et al. | |

OTHER PUBLICATIONS

Gingell et al., Analysis, simulation and improvement of tool crib operations in an aircraft maintenance hangar, 9th International Conference on Mechanical and Aerospace Engineering (ICMAE), pp. 668-673, Jul. 10, 2018.

Timonen et al., RFID technology as an inventory tool for future emergency service vehicles, Recent Advances in Computer Science and Networking, 2nd International Conference on Information Technology and Computer Networks (ITCN'13), Oct. 10, 2013.

Krishnan et al., Real-time asset tracking for Smart Manufacturing, Implementing Industry 4.0: The Model Factory as the Key Enabler for the Future of Manufacturing: 25-53, Apr. 4, 2021.

* cited by examiner

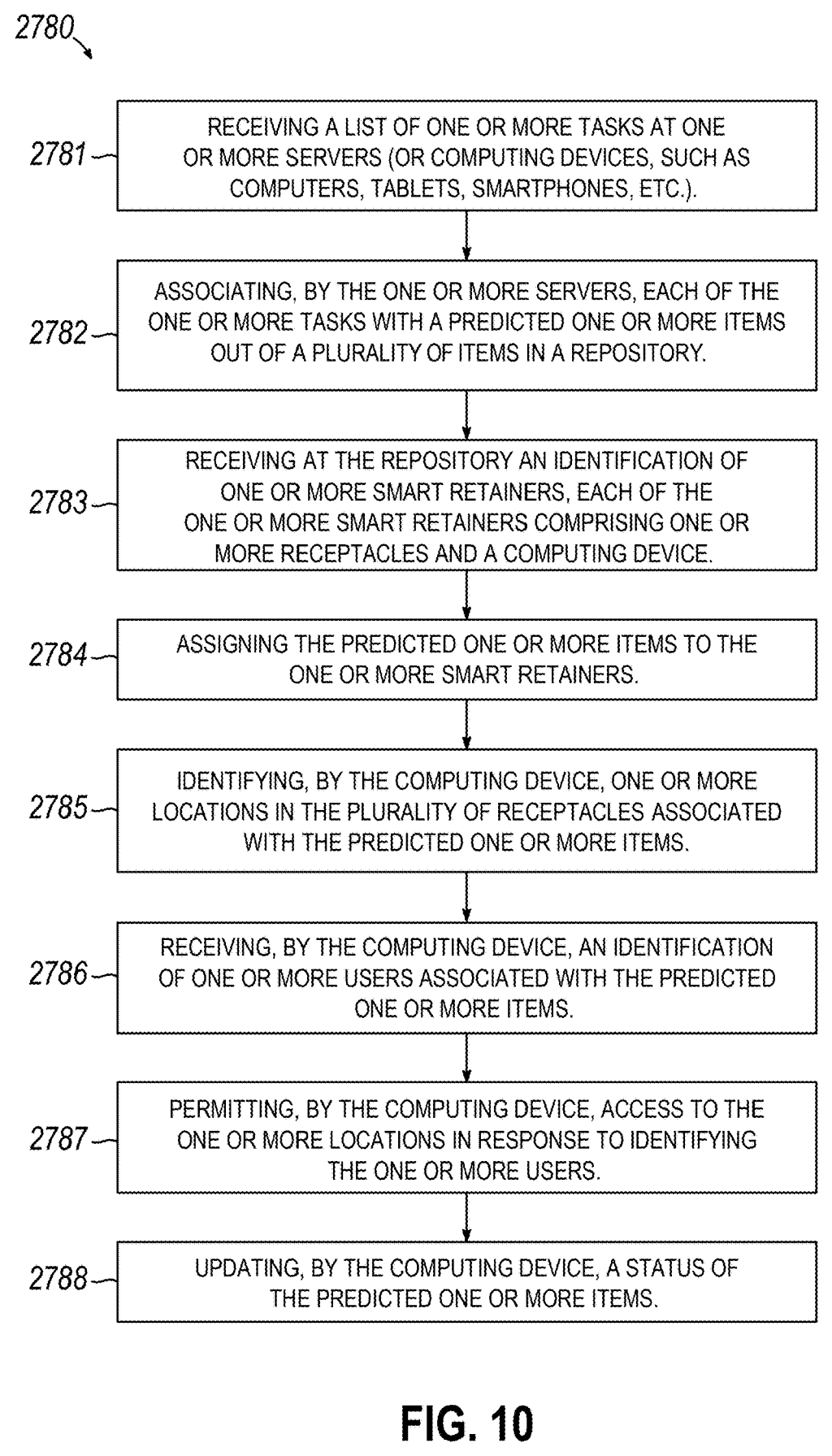

2780

2781 RECEIVING A LIST OF ONE OR MORE TASKS AT ONE OR MORE SERVERS (OR COMPUTING DEVICES, SUCH AS COMPUTERS, TABLETS, SMARTPHONES, ETC.).

2782 ASSOCIATING, BY THE ONE OR MORE SERVERS, EACH OF THE ONE OR MORE TASKS WITH A PREDICTED ONE OR MORE ITEMS OUT OF A PLURALITY OF ITEMS IN A REPOSITORY.

2783 RECEIVING AT THE REPOSITORY AN IDENTIFICATION OF ONE OR MORE SMART RETAINERS, EACH OF THE ONE OR MORE SMART RETAINERS COMPRISING ONE OR MORE RECEPTACLES AND A COMPUTING DEVICE.

2784 ASSIGNING THE PREDICTED ONE OR MORE ITEMS TO THE ONE OR MORE SMART RETAINERS.

2785 IDENTIFYING, BY THE COMPUTING DEVICE, ONE OR MORE LOCATIONS IN THE PLURALITY OF RECEPTACLES ASSOCIATED WITH THE PREDICTED ONE OR MORE ITEMS.

2786 RECEIVING, BY THE COMPUTING DEVICE, AN IDENTIFICATION OF ONE OR MORE USERS ASSOCIATED WITH THE PREDICTED ONE OR MORE ITEMS.

2787 PERMITTING, BY THE COMPUTING DEVICE, ACCESS TO THE ONE OR MORE LOCATIONS IN RESPONSE TO IDENTIFYING THE ONE OR MORE USERS.

2788 UPDATING, BY THE COMPUTING DEVICE, A STATUS OF THE PREDICTED ONE OR MORE ITEMS.

FIG. 10

TOOL INVENTORY AND TRACKING SYSTEM

CROSS REFERENCE TO RELATED INFORMATION

This application claims the benefit of United States of America priority application No. 63/608,571 filed on Dec. 11, 2023, titled "Tool Inventory and Tracking System," the contents of which are hereby incorporated in their entirety.

GOVERNMENT INTEREST

This invention was made with Government support under FA868421CB011 and FA864922P0945 awarded by Department of the Air Force. The Government has certain rights in the invention.

TECHNICAL FIELD

The present disclosure generally relates to inventory monitoring and tracking systems.

BACKGROUND

There exist a variety of inventory storage systems, for hospital supplies, vehicles, ammunition, tools, school supplies, etc. Some organizations that use a lot of supplies have trouble maintaining, tracking and managing an inventory. Items can be checked out to perform a task and may be stolen, broken, lost or damaged or otherwise misplaced or mismanaged.

SUMMARY

One embodiment under the present disclosure comprises a system for managing inventory. The system includes an item repository comprising a first computing device, the item repository configured to store a plurality of items. The system further comprises one or more smart retainers comprising a first plurality of receptacles and a second computing device, the second computing device configured to lock and unlock the first plurality of receptacles, the first plurality of receptacles configured to house one or more items of the plurality of items, wherein the second computing device is configured to detect where the one or more items are located within the first plurality of receptacles, the second computing device further configured to allow one or more users to check out the one or more items. The system also comprises one or more toolboxes comprising a second plurality of receptacles and a third computing device, the second plurality of receptacles configured to house at least one item of the plurality of items, wherein the third computing device is configured to detect where the at least one item is located within the second plurality of receptacles, the third computing device further configured to allow the one or more users to check out the at least one item. The system additionally comprises a smart device comprising a camera and configured to receive an identification of the one or more items and their location within the first plurality of receptacles and an identification of the at least one item and their location within the second plurality of receptacles, the smart device configured to be manipulated by the one or more users to capture an image of any of the first plurality of receptacles or the second plurality of receptacles and to determine if the one or more items and the at least one item is located in their respective locations. The system further comprises one or more servers configured to receive a task identification from the one or more users and to identify one or more necessary items of the plurality of items that are predicted to be used for the identified task and to allow one or more users associated with the task to check out the one or more necessary items, the one or more servers further configured to use a machine learning model to improve predictions of the one or more necessary items.

A further embodiment under the present disclosure comprises a smart retainer for distributing a plurality of items from a repository. The smart retainer comprises a plurality of receptacles configured to house a plurality of items; and a computing device configured to identify the plurality of items and their respective plurality of receptacles, and further configured to associate the plurality of items and the plurality of receptacles with one or more users.

A further embodiment under the present disclosure comprises a computer implemented method for training a machine learning model for optimizing supply use predictions for identified tasks. The method comprises obtaining a dataset of identified task outcomes; training the machine learning model using the dataset of identified task outcomes thereby obtaining a trained machine learning model, and storing the trained machine learning model.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which:

FIG. 10 illustrates a flow-chart of a method embodiment under the present disclosure;

DETAILED DESCRIPTION

Figure 1:
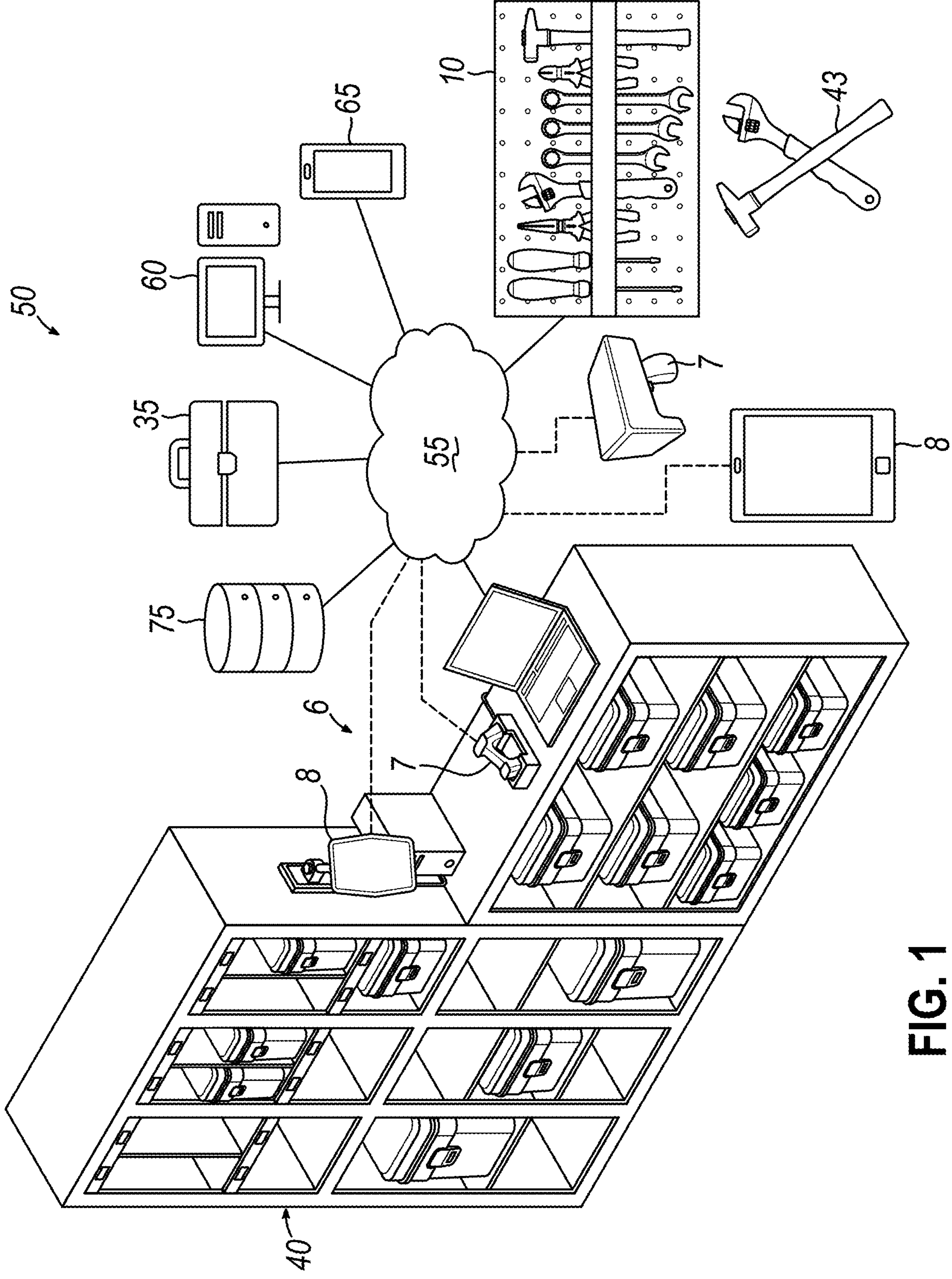
FIG. 1 illustrates one embodiment of an inventory system under the present disclosure.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

There currently exist certain challenges in the realm of inventory and tracking solutions for various types of supply or tool inventory systems. Current foreign object debris (FOD) prevention measures are sometimes effective, but very inefficient and expensive to implement. Challenges include e.g. difficulty in monitoring and auditing inventories, what users are using which items, how long items are used, wear and tear of items like tools, lost or broken items, miles driven/flown by inventory vehicles, tracking or predicting various other data, and other challenges. It can also be difficult to monitor or audit such data in various technological or security environments that can be present on locations such as Army/Navy/Air Force bases, repair locations, airports, and more. It is also difficult to make accurate predictions about tool life, tool requirements for defined tasks or repairs, tool costs, and more.

Certain aspects of the embodiments disclosed herein provide solutions to these or other challenges. Embodiments include an equipment provisioning solution that is capable of using data from existing maintenance information systems to automate the process of selecting and issuing items for various tasks, e.g., expected/predicted tool needs for aircraft maintenance, expected/predicted supplies for various medical tasks, expected/predicted vehicle needs at a vehicle depot (e.g., a taxi company, or airline). Embodiments can also include development and installation of smart lockers or toolboxes for tracking access to regulated equipment and generating logs for regulatory compliance. Certain embodiments can save money by being more efficient or easier to implement into existing systems.

Certain embodiments may provide one or more of the following technical advantages. Certain embodiments provide item storage, inventory management and tracking tools, automated inventory monitoring, user identification, and predictive capabilities for judging supply needs for various jobs. Embodiments are time, energy and cost efficient. Certain embodiments can achieve these benefits via process improvements while being retrofit capable with legacy systems. Embodiments can be implemented with minimal interruption to existing strategies, and there are multiple stages which can be implemented independently as needed.

Certain embodiments include a tablet or mobile application for using image recognition software to manage item checkout, including e.g.: confirming item identification, confirming user identification, confirming supply inventory, and more. Certain embodiments include an equipment provisioning assistant, a smart system that can predict tool, vehicle, ammunition, or supply needs for a specific task or repair job. Artificial Intelligence (AI) or Machine Learning (ML) can be utilized to get better predictive results over time or to interact with users. Certain embodiments include an automatic inventory supply box that automatically monitors inventory. Certain embodiments include a smart tool retainer that can comprise a locking, smart toolbox. Certain embodiments may comprise all of the described functionalities.

One embodiment of an inventory system is shown in FIG. 1. Inventory system 50 (or parts thereof) may be implemented at a location that manages or stores supplies, items, tools and/or other products. Some possible embodiments include locations with a need for repairs requiring tools. Examples could include an Armed Forces base, a shipping company or other logistic-related service provider, an airport hangar, a taxi/bus company depot, hospital supply room, school supply room, municipal vehicle depot, or other location with similar needs. Item repository or inventory 10 can be stored in a secure closet, backroom, warehouse or other storage room, and can represent an organization's total inventory (or total inventory for a specific location or division thereof). Smart retainer 40 can comprise a plurality of containers 40 (e.g., boxes, cabinets, hooks, tethers, shelves, depressions, recesses, aperture, retainers, drawers, closets, or other similar structures that can be loaded with, or attached to, items 43 from repository 10). Smart retainer 40 can be mobile, via e.g., wheels and can be pushed or comprise battery powered locomotion, or other similar means. Smart retainer 40 can comprise a checkout system 6 for checking out items 43. Checkout system 6 and/or repository 10 can comprise a scanner 7 for e.g., scanning a bar code on an item 43, scanning an NFC tag, detecting item 43 via Bluetooth, scanning an RFID (Radio Frequency Identification) tag or QR (quick response) code tag on an item 43, or other scanning/detection means for identifying an item 43 being checked out. Checkout system 6 and/or repository 10 can comprise a tablet/screen 8 that can provide a user interface (UI) for interacting with the system, checking out items 43, checking in items 43 or performing other tasks as described herein. Tablet 8 can comprise a touch sensitive display or other types of display that can allow a user to view inventory information, identity information, or other information. Tablet 8 can comprise a camera, scanner, or other means to scan item 43 or take pictures thereof as part of the checkout or check-in process. Server(s) 75, computing device(s) 60, and/or smart device(s) 65 can be coupled remotely or locally to provide additional tracking, or storage of data. Checkout system 6 may also comprise a portion of repository 10, or may be used to checkout items 43 from repository 10 to smart retainer 40. Scanner(s) 7 and/or tablet(s) 8 can be wirelessly or hardwired coupled to some/many/all components of system 50, such as server(s) 75, to assist in monitoring and tracking item-related data. In some embodiments, certain of computing devices 60, smart devices 65, or servers 75 may be co-located with repository 10, while others are coupled remotely. Network 55 can provide communicative coupling between various components of inventory system 50, such as e.g., server(s) 75, computing device(s) 60, smart device(s) 65, tablets 8, scanners 7, smart retainers 40, toolboxes 35, and/or other computing or smart devices described herein. Network 55 can comprise various networking or telecommunications technologies, such as cellular, Wi-Fi, Bluetooth, Starlink™, enterprise networks, ethernet, radios, mesh network, cloud relays, satellite, other technologies, and/or combinations of any of the foregoing, and/or multiple instances of any of the foregoing.

Computing device 60 can be communicatively coupled to other components of inventory system 50 including repository 10, smart retainer 40, and checkout system 6, and may allow a user(s) to track items 43 as they are checked out from repository 10. One or more servers 75 may store and track similar data and may be communicatively coupled to other components of system 50.

Inventory system 50 can comprise toolbox(es) 35 which can be mobile via wheels or other means and can comprise storage space for a variety of items 43. Toolbox 35 can comprise any type of mobile box or container for a variety of types of items 43. Toolboxes 35 may comprise shelves or drawers with e.g., cutouts sized to fit specific items 43 or a variety of items 43. Items 43 may be checked out from repository 10 and/or smart retainer 40 and placed in toolbox 35 for transport to another location or for use in a specific task or job. In certain embodiments tablet 8 or scanner 7 may be used during a checkout or check-in process for toolboxes 35, such as by scanning RFID tags, QR codes, or other similar means as described herein. In certain embodiments, certain RFID tags, QR codes, etc. may be associated with users (for example, an employee ID card may comprise an RFID tag, QR code, etc. for scanning/detection during check-in/checkout). Toolboxes 35 may comprise a variety of sensors to detect whether items 43 are present in an assigned drawer or space within toolbox 35. The sensors can be wired or wirelessly coupled to each other or to a monitoring module or system comprising toolbox 35 which may track the presence of items 43 and/or be communicatively coupled with other components of inventory system 50 to report, maintain, and track item inventory and location.

Smart device 65 can comprise a computing device, e.g., tablet, phone, laptop, etc., for detecting the presence of items 43 in a location. Smart device 65 preferably comprises a camera or other optical scanning tool which can be placed over e.g., a drawer/shelf in smart retainer 40, a drawer/shelf in toolbox 35, a wall/shelf/drawer in repository 10, or another area, and capture an image. Smart device 65 can be preloaded or notified as to what the given drawer/shelf/area and respective items 43 should look like (e.g., a group of tools that should be there, an expected quantity of supplies, etc.). Using an image or scan the smart device 65 can detect what items 43 are missing or present via image recognition tools or software and/or in combination with readings from sensors or tags, such as RFID tags or QR codes. This information can be tracked and stored by smart device 65 and/or communicated to other components of inventory system 50, which can all be communicatively coupled as desired. In certain embodiments smart device 65, or another component of inventory system 50, can use a trained machine learning object detection model to detect the presence of tools/items/equipment within a drawer, toolbox, or other surfaces where an object has an established location. Smart device 65 may comprise a stand-alone unit or embodiments of smart devices 65 may comprise portions of e.g., repository 10, smart retainer 40, or toolbox 35. Smart devices 65 may be used to perform inventory at required/desired intervals and/or to confirm inventory during checkout. The image recognition and ML models may also be used with captured images to detect and monitor tool conditions or maintenance needs, such as by monitoring wear and tear on items/vehicles/tools via image capture.

In one typical use case, a user may be a repairman and may be tasked with performing a maintenance task (e.g., fix a helicopter door, fix an aircraft engine, fix a blade on a tilt rotor aircraft, etc.). The repairman may approach repository 10, smart retainer 40, or toolbox 35. He may identify the task he is tasked to perform (e.g., by selecting a task from a list presented e.g., on tablet 8, smart device 65, computer 60, or entering a free text description via these devices (which free text could be detected or analyzed by AI/ML and matched to stored task lists)). Alternatively, the repository 10, smart retainer 40, or toolbox 35 may detect his presence and lookup a preloaded task for the repairman (e.g., from a list stored on servers 75). The specific task can be assigned to a given set of tools or supplies, which the repository 10, smart retainer 40, or toolbox 35 will allow the repairman to check out. Each tool can be checked out, e.g., by scanning with scanner 7, an image captured with tablet 8 or smart device 65, or other means. Servers 75 (or other computing devices, e.g., tablet 8 or computer 65) can record which tools were checked out to which person, the time, day, and/or other information. The repairman is then recorded and identified as the user of the specific tools or supplies needed for the task. When the task is complete, the repairman can return the tools and/or unused supplies to the tool repository 10, smart retainer 40, or toolbox 35, which may detect the presence or amount of said tools/supplies. The repairman or other user can check-in the used items with e.g., scanner 7 or tablet 8. Servers 75 or other computing devices can detect or receive the information related to the check-in, such as user ID, time, day, or other information.

In certain embodiments, a user/repairman may carry on their person a scanner 7 for use in check-in/checkout processes. For example, users may be assigned scanners 7 that they carry around with them during the day while performing tasks. For example, the scanner 7 can be used to scan items (e.g., via RFID tag, QR code, etc.) during check-in in the morning, and at checkout after a task/repair is finished. Such a scanner 7 that is carried by users may be able to be coupled wirelessly or via wire to e.g., server(s) 75 of FIG. 1 or other computing devices or components of inventory system 50, in order to transmit information, such as user ID, tool ID, time, day, etc.

In certain embodiments, a user may carry scanner 7, tablet 8, or another smart device on their person during the day or their working shift. Inventory system 50 may be configured such that the user is requested to perform an audit scan of their checked-out items at certain intervals during the day/shift. For example, the user may be required to scan their items once at check-out, once before lunch, at lunch, at each bathroom or coffee break, and another time at check-in. Other embodiments of scheduled audit scans are possible. Audit scans can be time-based, irregular, or other arrangements.

Further description is given below of various components and functionalities of inventory system 50.

Figure 2:
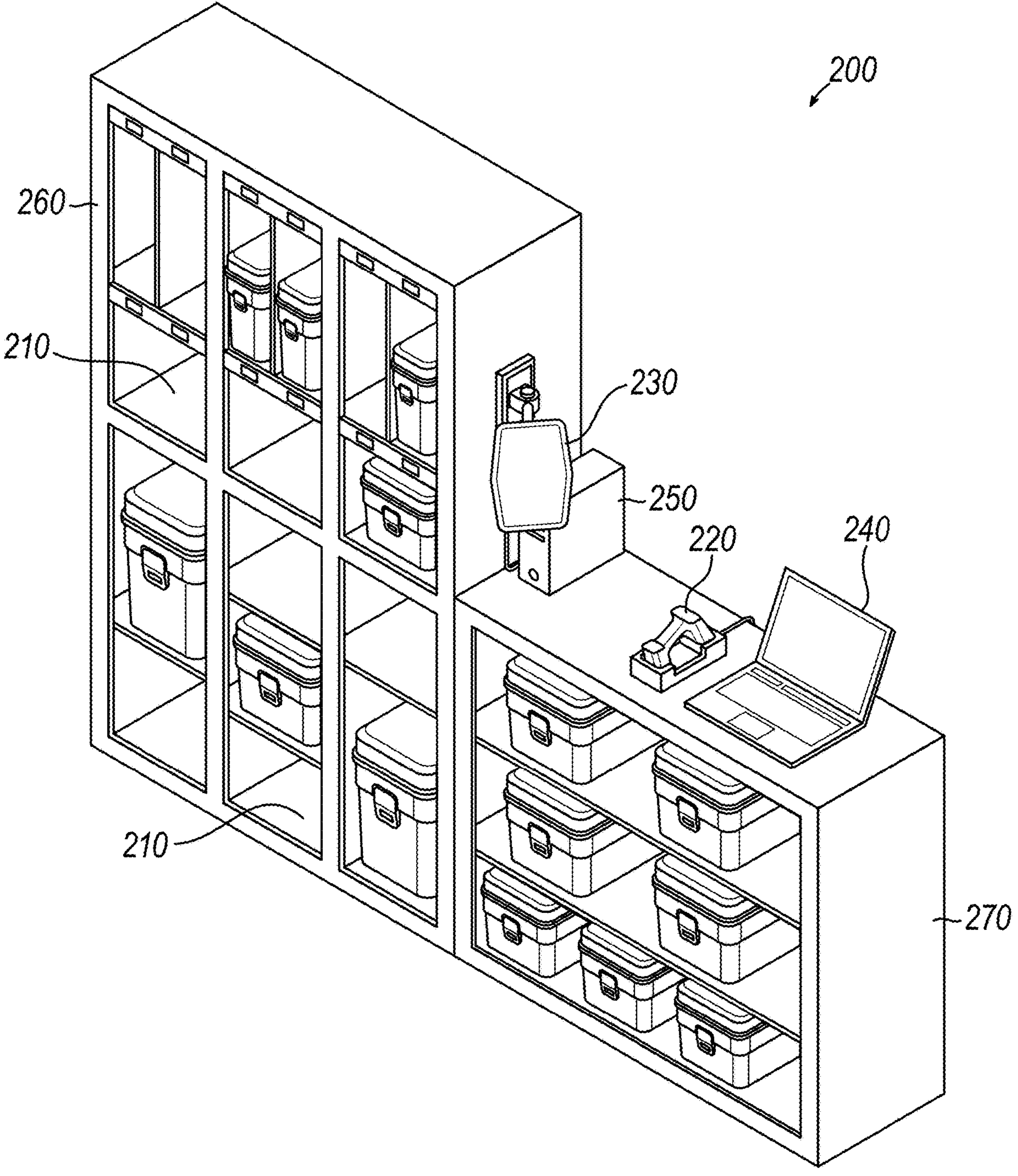
FIG. 2 shows an example embodiment of a smart tool retainer under the present disclosure.

FIG. 2 shows an embodiment of smart retainer 200 (similar to smart retainer 40 of FIG. 1). Smart retainer 200 can comprise a smart locker that can automate a tool checkout process. Drawers/shelves/tethers/receptacles 210 can store a variety of tools received or loaded from a large tool inventory. In certain embodiments, receptacles 210 can comprise a toolbox, such as toolbox 35 of FIG. 1. In certain embodiments receptacles 210 can comprise an area assigned to a specific item. For example, a broom could hang off of a hook coupled to smart retainer 200, or a dustpan could be laid on top of smart retainer 200. A receptacle 210 does not have to be lockable or otherwise closeable in all embodiments. In certain embodiments, a receptacle 210 could be an open location, like a flat surface, where a particular item is stored. In certain embodiments related to tracking the use of vehicles, a smart retainer 200 (or repository 10) could be a large space, such as an airplane hangar, bus depot, parking location, or other large space adapted to house vehicles. Computing device 240, tablet 230, and/or scanner 220 can be used to scan items that are checked out, such as scanning RFID tags, QR codes, Bluetooth connections, or other similar means. Database 250 can be coupled to any of computing device 240, tablet 230, and/or scanner 220 and can assist in storing check-in/checkout/item data. In some embodiments items within receptacles 210 can comprise, e.g., Bluetooth-enabled tags or may interact with sensors within receptacles 210. In certain embodiments, the presence of the tools may be detected automatically without the need for e.g., tablet 230 or scanner 220. For example, computing device 240 or tablet 230 can interact with scanner 220 or Bluetooth tags or sensors on or near tools, and automatically track the location and checkout of tools. Computing device can comprise a user interface allowing users to interact with smart retainer 200. In some embodiments computing device 240 or tablet 230 can comprise a controller for smart retainer 200, with or without a user interface. Computing device 240 or tablet 230 may be wired or wirelessly coupled to receptacles 210 and may unlock the receptacles as needed during a checkout process. The exact location of items within receptacles 210 may be tracked by computing device 240 or tablet 230 so that when a user desires a specific item the computing device 240 may indicate to a user which receptacle 210 to access or open and, when necessary, may unlock and/or open said receptacle 210. Scanner 220 or tablet 230 may also be used to scan e.g., RFID tags, QR codes, etc. that are associated with a user, such as an ID card to track who is checking out which specific items. The ID of a user may also be tracked automatically by e.g., Bluetooth enabled ID cards or facial recognition with a camera comprising computing device 240. In certain embodiments, receptacles 210 may be lockable and may only open once a user is identified. Computing device 240 may comprise a laptop, smartphone, tablet, or other similarly capable devices. While the embodiment of FIG. 2 is shown with tablet 230, scanner 230, computing device 240, and database 250, certain embodiments could comprise any number, or none, of these components, or just one of them that comprises a variety of the functionalities described with respect to FIG. 2. Hardware may include custom designed PCBs (printed circuit boards) and off-the-shelf electronic components and peripherals: smart locks, indicator lights, touchscreen tablet, barcode/QR scanners, printer, and backup power supply. Software/UI built for this application may enable several functions for multiple user types, e.g., maintainers, support staff, and admins. In some embodiments smart retainer 200 may have a person directly manipulating the checkout process with a scanner 220 etc. But in other embodiments, where e.g., Bluetooth-enabled components detect users and tools, the smart retainer 200 may be stand alone and may detect users and tools being checked out without the intervention of a person. In some embodiments a user may input e.g., a PIN code to access computing device 240 and/or receptacles 210. Each receptacle 210 may have a keypad for inputting a PIN code, or there may be e.g., only one keypad for an entire smart retainer 200.

Smart retainer 200 can comprise multiple portions 260, 270 which can enable modular implementations. Multiple portions 260, 270 can be combined or separated in multiple configurations as needed to transport or contain a desired number or type of items.

In certain embodiments, receptacles 210 may open to users on one side of smart tool retainer 200, e.g., on a front facing side. In such embodiments managers or admins may load the tools into receptacles from back door(s) which may only be open-able by certain personnel e.g., with special administrative PIN codes, RFID tags, etc. Smart retainer 200 may comprise e.g., lights on or near doors of receptacles 210 to indicate a state such as empty, stocked, locked, unlocked, or other information. Certain embodiments can comprise display screens to convey such information, with text, images, or other information to indicate statuses such as: empty, checked out, available, etc.

Advantages of smart retainer 200 include shortened checkout wait times, reduced peak labor burden for support counter, cost savings due to reduced labor, and increased item tracking capabilities.

In certain embodiments, a possible workflow for using smart retainer 200 may proceed as follows (though a variety of embodiments are possible). A maintainer/repairman logs in to computing device 240, tablet 230, scanner 220 (e.g., by scanning the users employee ID with RFID tag, etc.) and selects needed items from a list on a user interface (via touchscreen or other input means), or specific tools are already identified for the user. Door(s) on the receptacles 210 for the desired items may automatically pop open or be unlocked. Once doors are closed they can lock and the user can log out or be automatically logged out. Lights can indicate which bins are open. Support staff stocks the smart tool retainer 200 either from the rear in the version with an open back or from the front in the closed back version. A barcode or QR code on each individual item can be scanned into the system, e.g., via scanner 220 or tablet 230. The system can prevent users from stocking bins that should already have something in them. In certain embodiments, user are prevented from stocking items that already show up as stocked in the system, as tracked e.g., by computing device 240. Transactions can be logged for compliance and productivity tracking. Certain embodiments can use cloud-based processing and data management, such as e.g., by communicating data to server(s) 75 in FIG. 1, which may track and store inventory data from multiple smart retainers 200. Some, none, or all of tablet 230, scanner 220, computing device 240, database 250 can be communicatively coupled to e.g., servers 75 of FIG. 1.

In some embodiments it may be desired that smart retainer 200 not be communicatively coupled (wired or wireless) to other components such as server(s) 75 of FIG. 1. Such embodiments may implement an "air gap" mode, which can utilize a process for transferring data without connecting computers via a physical link or other type of network. In air gap mode, the smart retainer 200 can be designated as a user or location to which a tool is temporarily checked out. Information related to a given checked out item or other smart retainer 200 transaction can be printed from e.g., the computing device 240 on a physical receipt with e.g., QR codes (or other representations of the transaction) that can be scanned into the users' existing inventory software using a barcode/QR code scanner. For example, the receipt may be scanned at repository 10 of FIG. 1. This can enable near real-time updates to the inventory system 50, which can be useful for certain aircraft maintenance applications. Air gap or offline embodiments can be useful in situations where networks may not be secure from attacks, or in remote locations where there is no connectivity.

In certain embodiments, to mitigate challenges with sending signals to and from multiple smart locks and lights, in certain embodiments it is preferred that computing device 240 sends signals to and from decentralized printed circuit boards comprising or coupled to receptacles 210, or indicator lights or actuators comprising the same.

The optional modularity of portions 260, 270 of smart retainer 200 can allow portions 260, 270 to be coupled side by side, stacked vertically, connected by releasable latches, or connected and arranged in other ways or means. The receptacles 210 can be configured to various sizes by fitting the vertical and horizontal internal dividers into channels on e.g., cabinet walls comprising smart retainer 200 and/or portions 260, 270. There may also be channels placed along e.g., cabinet walls to run the necessary wiring or mount the smart locks or lights needed for the chosen configuration.

Smart retainers 200 can feature RFID readers (e.g., with custom designed antennas for the shape or layout of smart retainers 200), IR sensors, or other sensors to identify whether an item is present. Iterations can also utilize e.g. the onboard computing device 240 or tablet 230 to communicate with other products via various types of handshakes or electronic confirmation. An example would be if a user of toolbox 35 were to return their items to the smart retainer 200. To confirm that all items are present the user could initiate a sequence on either the smart retainer 200 or toolbox 35 and confirm on the other device. Scanner 220 or tablet 230 could alternatively be used to scan e.g., items/RFID/QR/etc. If the toolbox 35 confirmed that all items were present, the user could be allowed to check the toolbox 35 into the smart retainer 200. If all tools are not present, the user could be required to return the tools to e.g., repository 10 of FIG. 1 to determine the location of the tools identified as missing.

Figure 3A:
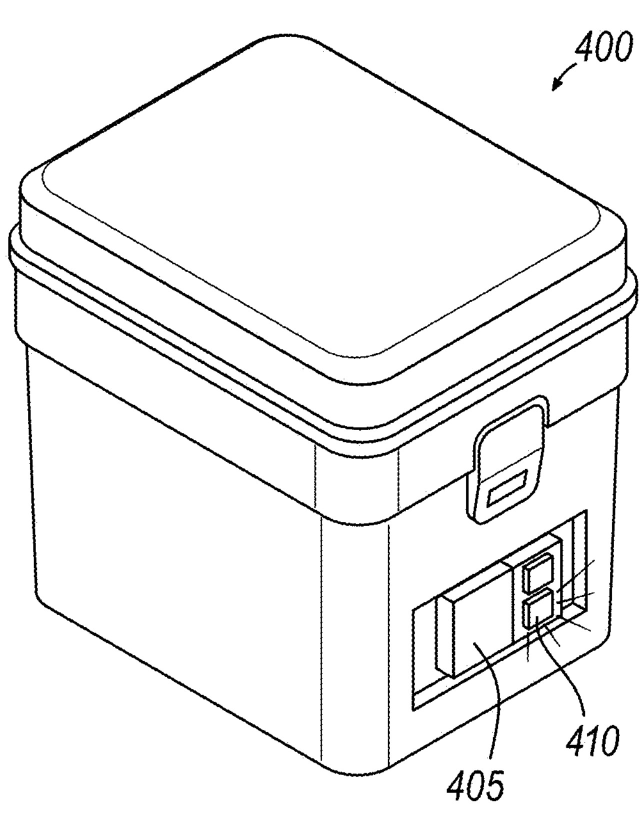
FIGS. 3A-3B show an example embodiment of a toolbox under the present disclosure.
Figure 3B:
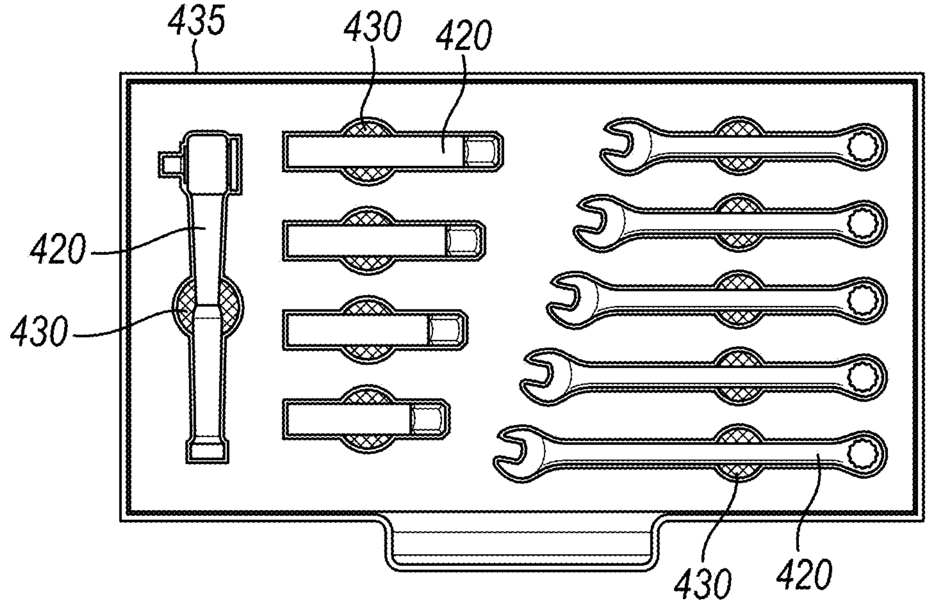

Possible embodiments of a toolbox 400 are shown in FIG. 3A-3B. Toolbox 400 can be an embodiment of toolbox 35 of FIG. 1. Toolbox 400 can be an automatic inventory toolbox 400, capable of automatically tracking the items contained within, and communicating the inventory status via e.g., network connections to other components of FIG. 1, or via a display screen or lights 410 to a user. FIG. 3A displays a closed toolbox 400 and FIG. 3B displays a tray or drawer 435 from within toolbox 400. Toolbox 400 can comprise a plurality of drawers 435.

As shown in FIG. 3B, automatic inventory toolbox 400 can comprise a set of sensors 430 that can be installed in e.g., an existing or new toolbox to detect the presence or absence of items 420, such as tools, hospital supplies, etc. There are multiple sensor types possible, including RFID tags, IR break sensors, weight sensors, or others. Sensors 430 can be coupled wired or wirelessly with controller 405 which can control indicator lights 410. Controller 405 can track and monitor what items are stored within toolbox 400. Controller 405 can be coupled communicatively to e.g. computing devices of FIG. 1 or FIG. 2.

Indicator lights 410 of FIG. 3A, controlled by controller 405, can show status to a user. Status can be green light for full inventory, or red light for missing items 420. Other embodiments can use different types of light notifications. Display screens with a UI can also be used. Transactions can be logged for compliance purposes and may be exported, e.g., to server(s) 75 of FIG. 1. In addition to indicating item presence or absence, the UI can allow or require a user to note (or be notified) whether any items are broken or unserviceable. Controller 405 can be powered by batteries, e.g., lithium ion, rechargeable, disposable, etc., or other power supply means.

Toolbox 400 can provide an on-demand inventory scan/audit to check whether items 420 are missing from toolbox 400. Inventory can be logged at specific intervals or upon the occurrence of certain events, such as the opening of toolbox 400. The solutions described in relation to toolbox 400 can be retrofit to existing toolboxes. Implementations of toolbox 400 can be modified over time to add or subtract items and can be adaptable to varying toolbox sizes. Advantages include shortened time windows for identifying missing items, decreased uncertainty around a missing item's last location, decreased times at end-of-shift to locate a missing item, and increased on-task time for maintenance staff.

In certain embodiments, a user may press a button on controller 405 to query the toolbox 400 at the beginning of a shift to set a baseline. In certain embodiments, this can be an administrator-only feature to prevent baselining later when an item 420 is missing. Then at several points throughout the day, the user may query the toolbox 400 to confirm everything is present.

In certain embodiments, sensors 430 may comprise RFID tags. For the RFID tags, there may be scenarios where it's preferable to locate the RFID tags in the sensors instead of on the items. In such embodiments the tags may be secured to the toolbox 400 under the item 420 and an antenna may be mounted above for communicating between the RFID tag and e.g., the controller 405. When the item 420 is placed in its designated space in a foam cutout, the signal can be interrupted, so a lack of signal can indicate when a item 420 is present. Other wiring embodiments are possible.

In retrofit embodiments, the foam lining the bottom of each drawer 435 can be replaced/adjusted and sensors 430 embedded in the foam. The foam may be implemented such that the user may modify the foam for different arrangements, such as tearaway portions that can be recombined in a desired arrangement.

Figure 4A:
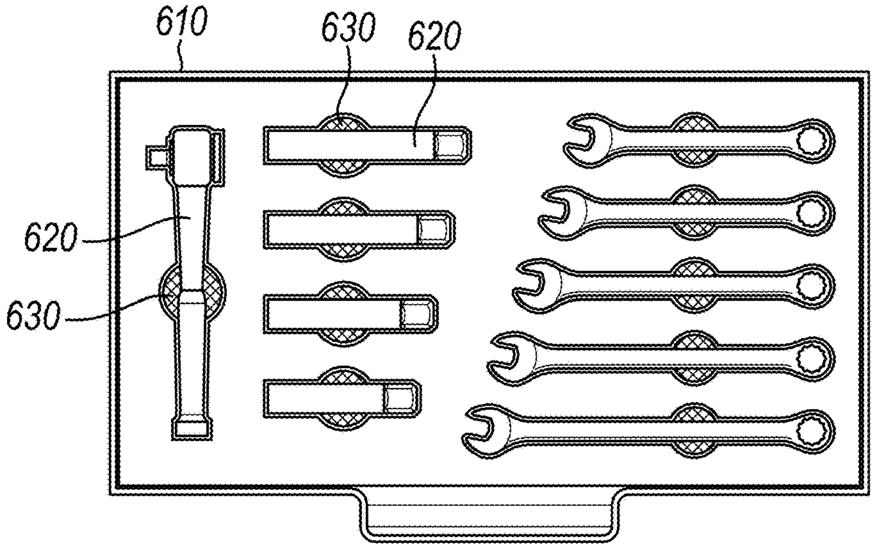
FIGS. 4A-4C show an example embodiment of an inventory scanning system under the present disclosure.
Figure 4B:
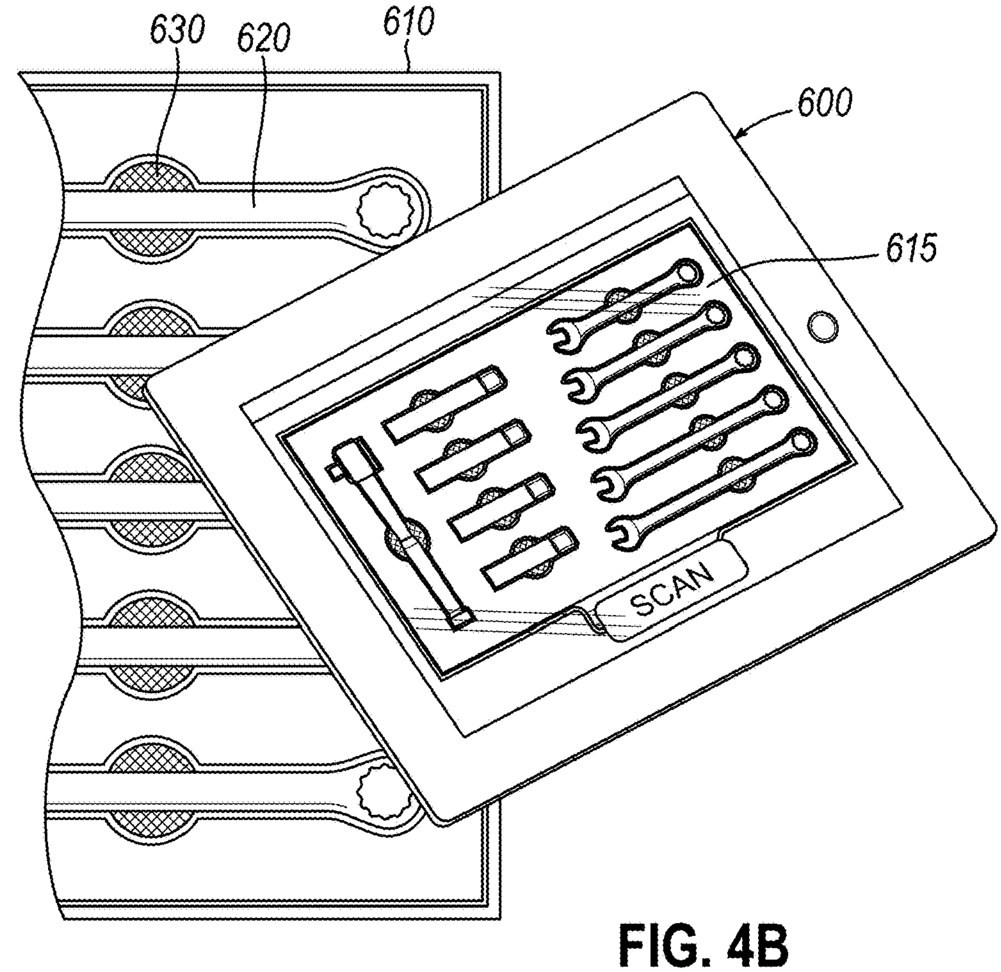
Figure 4C:
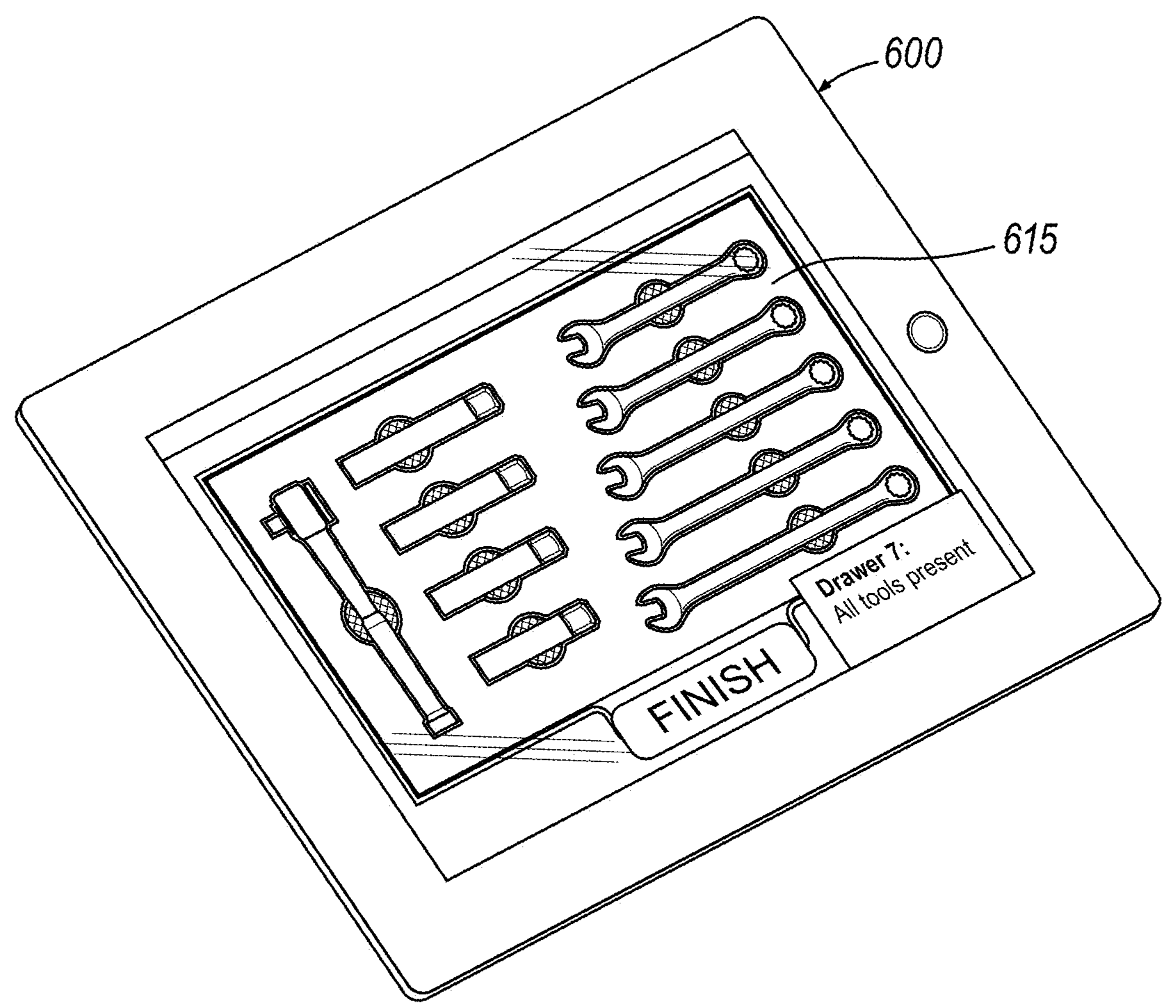

Smart device 65 (or tablet(s) 8) of FIG. 1 can comprise an inventory scanning system. FIGS. 4A-4C help to show how such a scanning system can function. The scanning system can comprise image recognition software hosted locally on a mobile smart device 600 (e.g., tablet, phone, laptop, etc.). Smart device 600 can use a trained ML object detection model to detect the presence of tools/items/equipment 620 within a receptacle 610 (e.g., drawer, toolbox, or other surfaces where an object has an established location). This can be done through an optical scan of the area to be inventoried, such as a drawer or shelf. FIG. 4B displays a smart device 600 with a scanned image 615. Smart device 600 can be preloaded, be notified (by e.g., another component of FIG. 1), be notified by sensors 630, or track, what items 620 should be present in receptacle 610. Smart device 600 can capture image 615 and then provide status of the drawer using trained ML models and/or comparison to a baseline scan to ensure all items 620 are present. Each inventory audit check can be logged with digital images as backup. Smart device 600 may also optionally detect foreign object debris or items that do not belong in the toolbox. The inventory scanning system illustrated in FIGS. 4A-4C can be implemented in e.g., a tablet or smartphone application, and can be used to perform inventory at required intervals, provide baseline inventory at item checkout from e.g., smart retainer 40 or repository 10 in FIG. 1. A user questionnaire presented via smart device 600 can also allow a user to confirm an inventory status with image recognition software and may present a user with a questionnaire which can confirm item serviceability. Various other scanning tools (e.g., NFC, QR, RFID scanning) can be implemented by e.g., smart device 600 to obtain a confirmation of an inventory status obtained by image recognition.

Advantages of the scanning system can include: reduced time window for lost items; minimal hardware purchase required; digital log of every inventory throughout the day. In some embodiments, a user may be forced to return items in issued conditions, or to alternatively do an override, which is logged and/or requires a user to get a second check from support staff upon return.

In certain embodiments, a possible workflow using the scanning system can proceed as follows. At the beginning of a shift a user can scan each drawer 610 in a toolbox or smart retainer with smart device 600 to set a baseline. This initial scan 615 can establish all of the items 620 that are present at the beginning of a shift. At required intervals such as lunch break or moving job locations the user can repeat the scan to ensure all items 620 are present and in the proper location. At the conclusion of a shift the user can perform a final inventory. Any inventory check may also contain a brief questionnaire regarding item serviceability to ensure that all returned items are in proper working order. The data captured in each of these inventory scans may then be transmitted at check-in or at another time via wireless or wired signal to e.g., the computing device 240 of FIG. 2 (if returning to a smart retainer 200) or to a kiosk located at the repository 10 of FIG. 1. Support staff can then confirm and finalize tool turn-in.

Certain embodiments under the present disclosure can comprise smart locks, which may be implemented in new or retrofit embodiments. One embodiment of a smart lock 700 is shown in exploded view in FIGS. 5A-5C. Smart locks 700 can be used to lock e.g., toolbox 400 of FIG. 3A, receptacles 210 of FIG. 2, or other lockable components. Smart lock 700 can comprise key sleeve/cover 770, mounted housing 750, battery/power source 710, linear solenoid/actuator 730 (to manipulate/be manipulated by key sleeve/cover 770), electronic components 720 (e.g., microprocessor and RFID reader), and face plate 760. A retrofit smart lock 700 can turn a traditional keyed lock into one that has controlled electronic access for the purposes of reducing time spent in line to retrieve keys and remove the problem of lost keys. A smart lock 700 might be installed by covering the key with a sleeve 770. The housing 750 and electronics 720 can be mounted e.g., with fasteners connecting to the toolbox, covered and secured with additional screws. The key can be bound by the sleeve and electronic stop (e.g., solenoid or actuator 730). An authorized user can then place an RFID badge near the device and it can electronically unbind the key sleeve 740, allowing the user to twist the sleeve 740 (and key) to unlock the toolbox. Other embodiments might work by NFC, Wi-Fi, or other wireless means. An electronic log can be kept of all access and attempts to access transactions. A smart lock 700 can be integrated with e.g., smart retainer 40 or toolbox 35 of FIG. 1.

Figure 6:
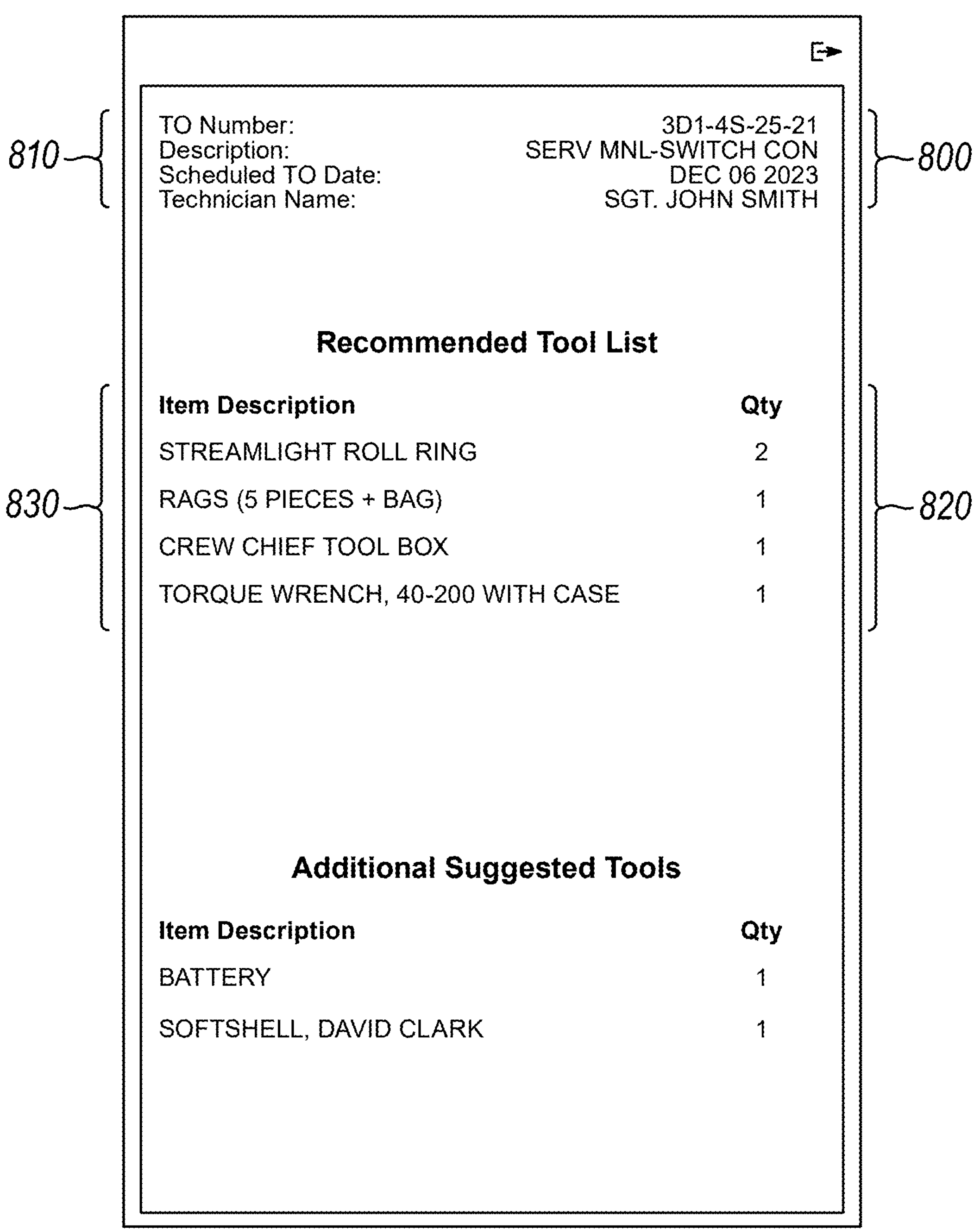
FIG. 6 shows an example embodiment of a predicted tool requirement for a task under the present disclosure.

Certain embodiments of the present disclosure can comprise the use of AI/ML to analyze tool use, tool degradation, repair costs, and other outcomes related to tool inventories. In certain embodiments, server(s) 75 of FIG. 1 can store inventory data from components of inventory system 50, can store AI/ML models for use in analyzing inventory data and perform such AI/ML-based analyses. This can help improve predictive item/tool/supply needs for given tasks. FIG. 6 illustrates a possible embodiment of a predicted item list 800 for a given job. List 800 can comprise miscellaneous data 810 (e.g., job or user ID information), tool names 830, and quantities 820. Other embodiments are possible.

In certain embodiments, an AI/ML model can be used to improve predictions of what type, number, size of items, tools, or supplies are needed for a given task. For example, a AI/ML model may help inventory system 50 improve predictions, over time, of how much paint, paint brushes, paint rollers, etc. are needed to repaint a 747 airplane. In another example, the system 50 may better predict, over time, how many man hours are needed to reassemble a helicopter engine. In a typical use case, a user(s) may be assigned a given task and may approach repository 10, smart retainer 40, or toolbox 35 of FIG. 1 to check out the predicted amount of items, tools and supplies. Servers 75 (or another computing device in inventory system 50) may implement an AI/ML model and have previously determined a predicted amount of items, tools, supplies or other consumables to use for a given task. These predictions can incorporate variables like location, weather, altitude, tool or supply availability, time of day, or other factors to make conditions-based recommendations. Data sources might include inventory systems, transaction records, standardized sets of maintenance instructions, or other records. Recommendations from online communities or other subject matter experts may be used to fill in gaps. Data related to item serviceability or frequency of use may be used to make recommendations about ordering replacement items in advance.

These AI/ML models can: integrate data from existing inventory systems; use historic transaction data to generate recommended/predicted equipment lists; provide equipment lists to support staff in advance for ordering additional supplies. Items can be picked up at the item repository 10 as usual or can be delivered directly to work site or placed in a smart retainer 40 or toolbox 35 for pickup later.

Advantages of the AI/ML models include: shortened wait times at item check-out and turn-in; reduced peak labor burden for support counter, transferring workload to less busy times; repairmen less likely to forget items, reducing return trips to the repository or other storage area; repairmen less likely to check out items they don't need, reducing likelihood of a shortage of supplies, and reducing foreign object debris risk.

Inventory system 50 of FIG. 1 can perform AI/ML-based methods such as such as described herein, for e.g., analyzing what predicted item/tool/supply needs are appropriate for given tasks, identifying and improving predictions of item degradation and wear and tear, improving personnel needs for given repair tasks, and more. Optimizing these factors may lead to cost savings. In certain embodiments inventory system 50 can comprise a AI/ML engine in servers 75 or in other components for training or implementing an AI/ML model. The architecture of an AI/ML model (e.g., structure, number of layers, nodes per layer, activation function etc.) may need to be tailored for each particular use case. For example, properties to vary can include e.g.: item names, item brand name, tool size, personnel numbers, local weather, local altitude, helicopter type, aircraft type, engine type, and a variety of other factors. These may all need to be considered when designing the ML model's architecture.

Figure 7:
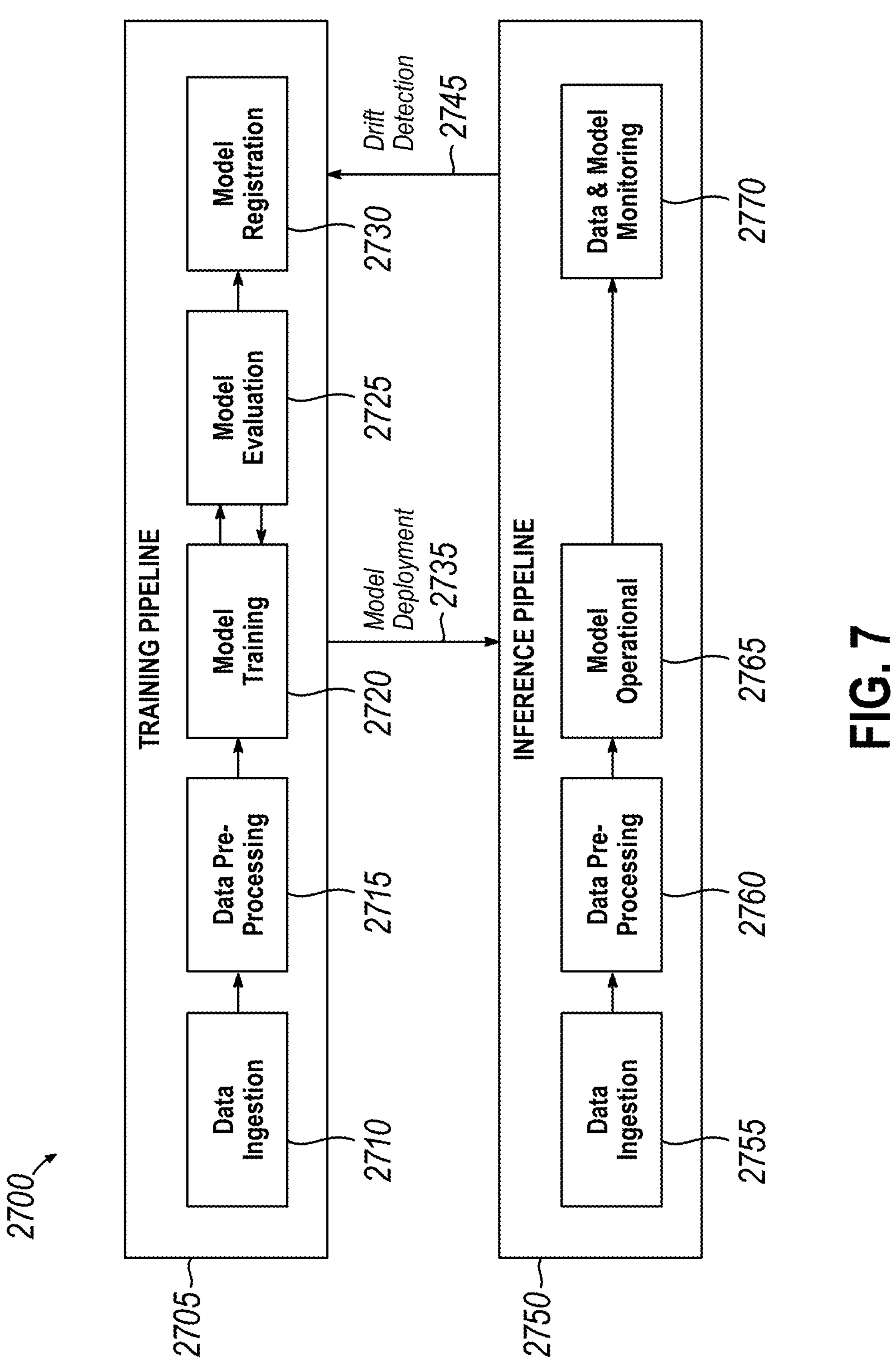
FIG. 7 shows an example flow chart of training and inference pipelines for machine learning in accord with some embodiments under the present disclosure.

Building an AI/ML model includes several development steps where the actual training of the ML model is just one step in a training pipeline. An important part in AI/ML development is the AI/ML model lifecycle management. One embodiment of a model lifecycle management procedure 2700 is illustrated in FIG. 7. The model lifecycle management can comprise two pipelines: a training pipeline 2705 and an inference pipeline 2750.

At 2710 in the training pipeline 2705, data ingestion 2710 can occur, which includes gathering raw (training) data from a data storage. After data ingestion 2710, there may also be a step that controls the validity of the gathered data. At 2715 data pre-processing can occur, which can include feature engineering applied to the gathered data. This may involve, e.g., data normalization or data formatting or transformation required for the input data to the AI/ML model. After the AI/ML model's architecture is fixed, it can be trained on one or more datasets. At 2720 model training can be performed in which the AI/ML model can be trained with the raw training data. To achieve good performance during live operation in a system (the so-called inference phase), the training datasets can be representative of actual data the AI/ML model will encounter during live operation. The training process often involves numerically tuning the ML model's trainable parameters (e.g., the weights and biases of the underlying neural network (NN)) to minimize a loss function on the training datasets. The loss function may be, for example, based on a maximum/minimum spend on tools or supplies, a maximum/minimum speed of performing a task, or other output. The purpose of the loss function is to meaningfully quantify the reconstruction error for the particular use case at hand. At 2725 model evaluation can be performed where the performance is benchmarked to some baseline. Model training 2720 and evaluation 2725 can be iterated until an acceptable level of performance is achieved. At 2730 model registration occurs, in which the AI/ML model is registered with any corresponding data on how the AI/ML model was developed, and e.g., AI/ML model evaluation data. At 2735 model deployment occurs, wherein the trained/re-trained AI/ML model is implemented in the inference pipeline 2750.

Data ingestion 2755 in the inference pipeline 2750 refers to gathering raw (inference) data from a data source. Data pre-processing 2760 can be essentially identical/similar to the data pre-processing 2715 of the training pipeline 2705. At 2765, the operational model received from the training pipeline 2705 is used to process new data received during operation of e.g., inventory system 50 of FIG. 1 or components thereof. At 2770 data and model monitoring is performed. Here the inference data is analyzed to determine whether the inference data are from a distribution that aligns with the training data, as well as monitoring model outputs for detecting any performance, or operational, variance or drifts. The variance or drift is used at 2745 (drift detection) to update the AI/ML model registration.

The training process is typically based on some variant of a gradient descent algorithm, which, at its core, can comprise three components: a feedforward step, a back propagation step, and a parameter optimization step. These steps can be described using a dense ML model (i.e., a dense NN with a bottleneck layer) as an example.

Feedforward: A batch of training data, such as a mini-batch, (e.g., several downlink-channel estimates) is pushed through the ML model, from the input to the output. The loss function is used to compute the reconstruction loss for all training samples in the batch. The reconstruction loss may be an average reconstruction loss for all training samples in the batch.

The feedforward calculations of a dense ML model with N layers (n=1, 2, . . . , N) may be written as follows: The output vector $a^{[n]}$ of layer n is computed from the output of the previous layer $a^{[n-1]}$ using the equations:

$$z^{[n]} = W^{[n]} \cdot a^{[n-1]} + b^{[n]},\ a^{[n]} = g\left(z^{[n]}\right) \tag{1}$$

In the above equation, $W^{[n]}$ and $b^{[n]}$ are the trainable weights and biases of layer n, respectively, and g is an activation function applied elementwise (for example, a rectified linear unit).

Back propagation (BP): The gradients (partial derivatives of the loss function, L, with respect to each trainable parameter in the ML model) are computed. The back propagation algorithm sequentially works backwards from the ML model output, layer-by-layer, back through the ML model to the input. The back propagation algorithm is built around the chain rule for differentiation: When computing the gradients for layer n in the ML model, it uses the gradients for layer n+1.

For a dense ML model with N layers the back propagation calculations for layer n may be expressed with the following well-known equations:

$$\frac{\partial L}{\partial a^{[n]}} = \left[W^{[n+1]}\right]^T \cdot \frac{\partial L}{\partial z^{[n+1]}} \tag{2}$$

$$\frac{\partial L}{\partial z^{[n]}} = \frac{\partial L}{\partial a^{[n]}} * g^{[n]\prime}\left(z^{[n]}\right) \tag{3}$$

$$\frac{\partial L}{\partial W^{[n]}} = \frac{\partial L}{\partial z^{[n]}} \cdot \left[a^{[n-1]}\right]^T \tag{4}$$

$$\frac{\partial L}{\partial b^{[n]}} = \frac{\partial L}{\partial z^{[n]}} \tag{5}$$

where * here denotes the Hadamard multiplication of two vectors.

Parameter optimization: The gradients computed in the back propagation step are used to update the ML model's trainable parameters. An approach is to use the gradient descent method with a learning rate hyperparameter (a) that scales the gradients of the weights and biases, as illustrated by the following update equations:

$$W^{[n]} = W^{[n]} - \alpha \cdot \frac{\partial L}{\partial W^{[n]}} \tag{6}$$

$$b^{[n]} = b^{[n]} - \alpha \cdot \frac{\partial L}{\partial b^{[n]}} \tag{7}$$

It is preferred to make small adjustments to each parameter with the aim of reducing the average loss over the (mini) batch. It is common to use special optimizers to update the ML model's trainable parameters using gradient information. The following optimizers are widely used to reduce training time and improving overall performance: adaptive sub-gradient methods (AdaGrad), RMSProp, and adaptive moment estimation (ADAM).

The above process (feedforward, back propagation, parameter optimization) is repeated many times until an acceptable level of performance is achieved on the training dataset. An acceptable level of performance may refer to the ML model achieving a pre-defined average reconstruction error over the training dataset (e.g., normalized MSE of the reconstruction error over the training dataset is less than, say, 0.1). Alternatively, it may refer to the ML model achieving a pre-defined value chosen by a user.

In some implementations, a function F(•) may be generated by a AI/ML process, such as, for example, supervised learning, reinforcement learning, and/or unsupervised learning. It should further be understood that supervised learning may be done in various ways, such as, for example, using random forests, support vector machines, neural networks, and the like. By way of non-limiting example, any of the following types of neural networks that may be utilized, including, deep neural networks (DNNs), convolutional neural networks (CNNs), and recurrent neural networks (RNNs), or any other known or future neural network that satisfies the needs of the system. In an implementation using supervised learning the neural networks may be easily integrated into the hardware described in inventory system 50 of FIG. 1 (e.g., in the form of simple vector-matrix multiplications).

Figure 8:
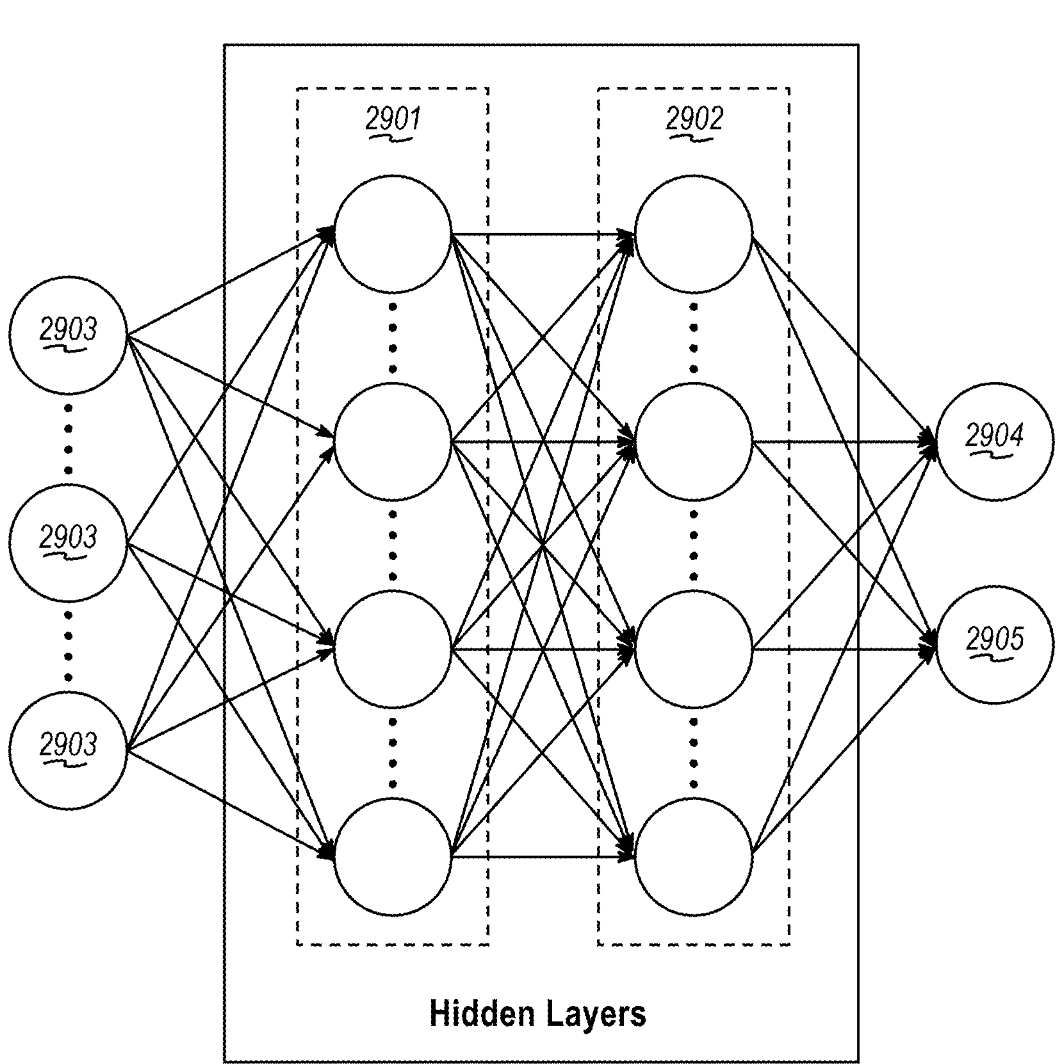
FIG. 8 shows an embodiment of a neural network under the present disclosure.

Referring now to FIG. 8, an example NN 2900 (e.g., DNN) is shown. In some implementations, and as shown, the neural network 2900 may include two hidden layers represented by dashed boxes 2901 and 2902. In one implementation, the inputs 2903 may be fed into the NN 2900. Next, the inputs 2403 may go through a set of hidden layers (e.g., 2901 and/or 2902). Once the inputs 2903 pass though the hidden layers 2901 and/or 2902, they may be output (e.g., as an output layer) as e.g., item/tool/supply costs per year 2904; cost of lost or stolen items 2905; or another output valuable for e.g., inventory analysis. Possible inputs can include e.g.: item names, tool brand name, item size, personnel numbers, local weather, local altitude, helicopter type, aircraft type, engine type, tool check out status, schedule data, tool testing schedules, tool servicing schedules, and a variety of other factors. Possible outputs could be, e.g., causes of item unavailability (e.g., theft, servicing, check out status, testing, etc.), tool or other maintenance costs, use data by employee, per employee cost data, recommended servicing schedules, or other valuable data for item/supply/tool and costs analysis.

As should be understood by one of ordinary skill in the art, in order for the NN 2900 to output proper a proper analysis, it should be trained properly (e.g., with a collection of samples) to accurately extract the likelihood values. If not trained properly, overfitting (e.g., when the NN memorizes the structure of the preambles but is unable to generalize to unseen preamble characteristics) or underfitting (e.g., when the NN is unable to learn a proper function even on the data that it was trained on) may happen. Thus, implementations may exist that prevent overfitting or underfitting, involving a set of well-engineered features that must be extracted from the preamble characteristics.

Figure 5A:
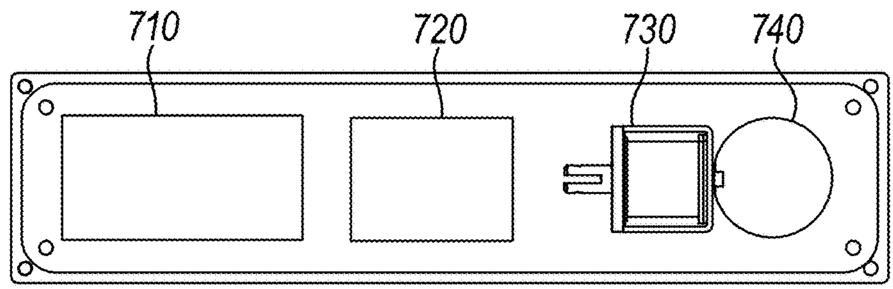
FIGS. 5A-5C show example embodiments of a smart lock under the present disclosure.
Figure 5B:
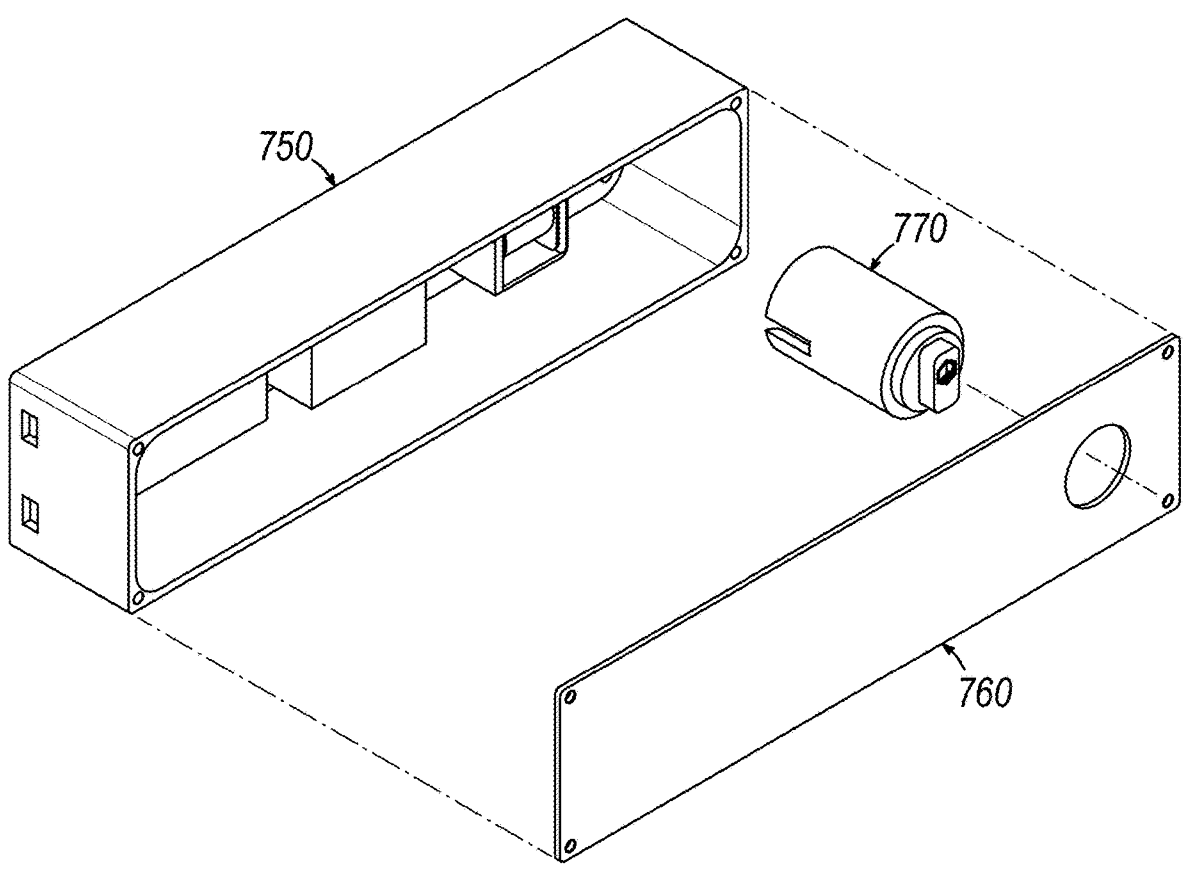
Figure 5C:
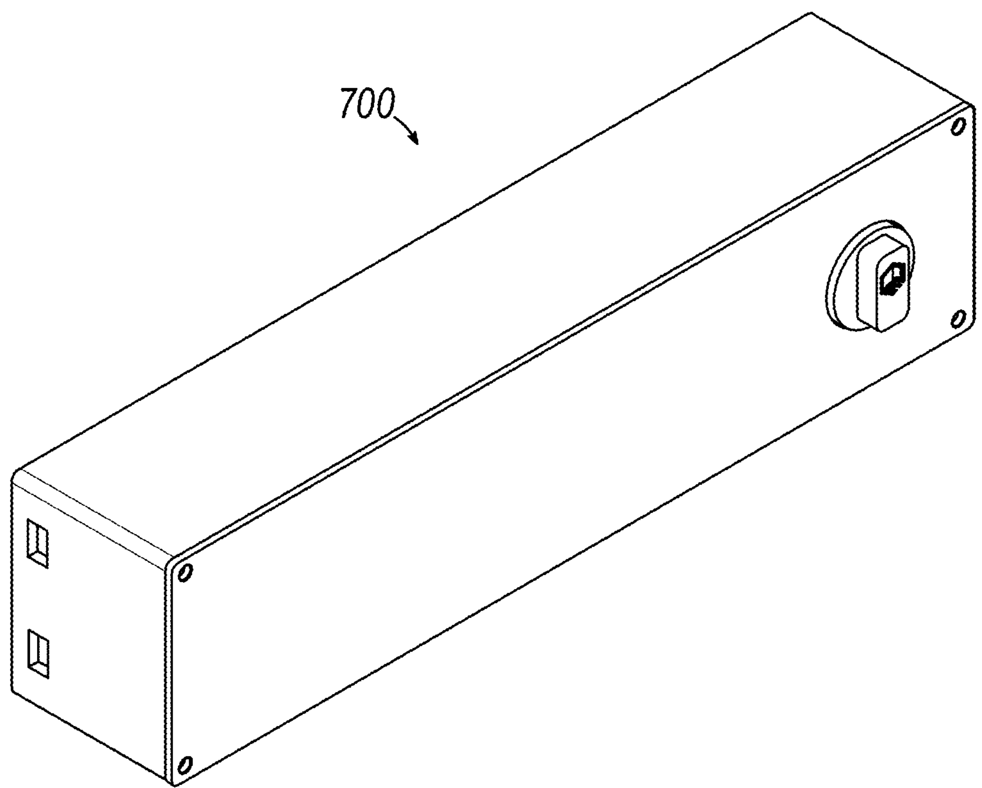
Figure 9:
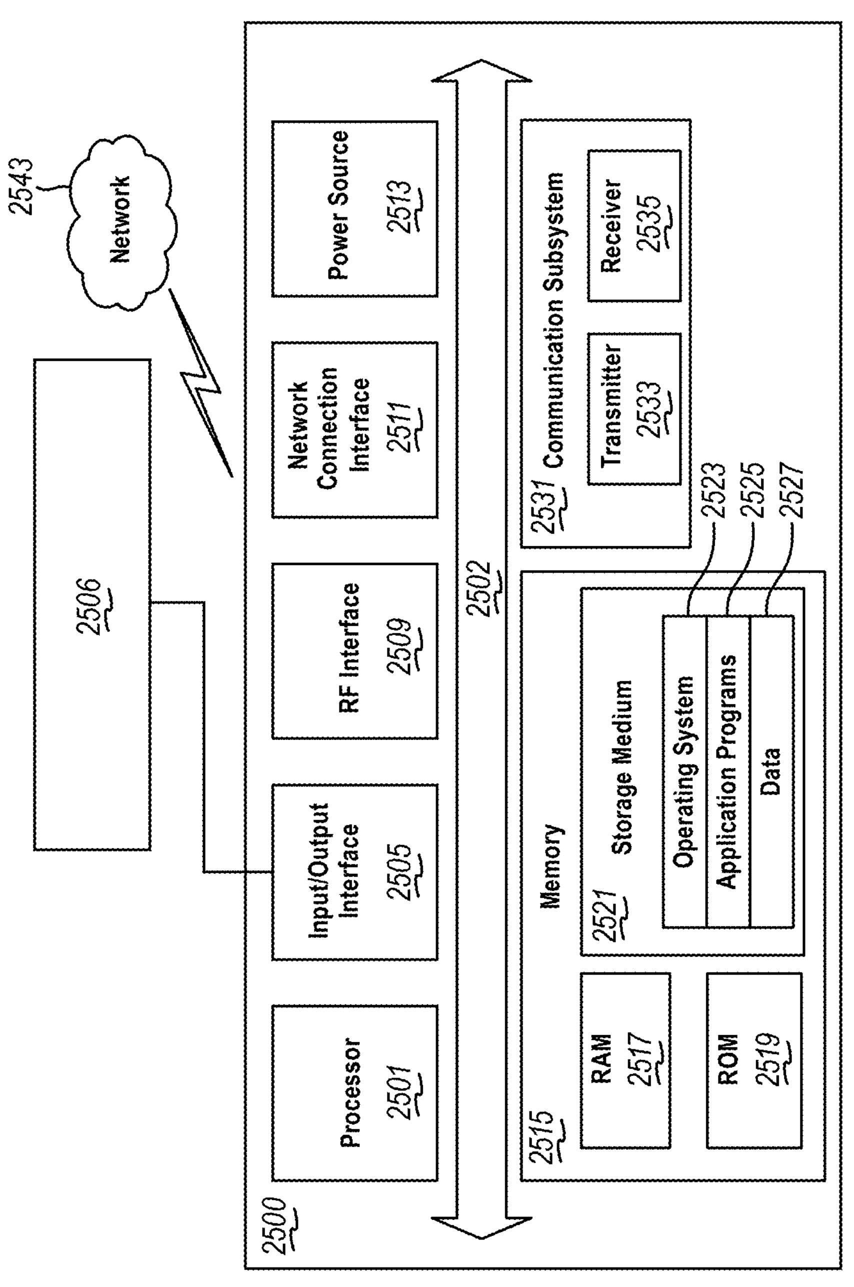
FIG. 9 shows an embodiment of a computing device for use in various embodiments under the present disclosure.

FIG. 9 illustrates an embodiment of various computing devices within inventory system 50 of FIG. 1, or components thereof e.g., servers 75, computing device 240 of FIG. 2, smart device 600 of FIG. 4B, computing device 405 of FIG. 3A, electronic components 720 of FIG. 5A-5C, or other computing or smart devices described herein. FIG. 9 shows a schematic block diagram of a computing device 2500 (or components thereof) according to certain embodiments of the present disclosure. System 2500 can be used to analyze and/or optimize: the functionalities described with respect to e.g., servers 75, computing device 240 of FIG. 2, smart device 600 of FIG. 4B, computing device 405 of FIG. 3A, or other computing or smart devices described herein, or to perform ML-related tasks and analyses as described herein.

Computing device 2500 includes processor 2501 that is operatively coupled via a bus 2502 to an input/output interface 2505, a power source 2513, a memory 2515, a RF interface 2509, network communication interface 2511, and/or any other component, or any combination thereof. The level of integration between the components may vary from one embodiment to another. Further, certain computing devices 2500 (or components thereof) may contain multiple instances of a component, such as multiple processors, memories, transceivers, transmitters, receivers, etc.

The processor 2501 is configured to process instructions and data and may be configured to implement any sequential state machine operative to execute instructions stored as machine-readable computer programs in memory 2515. Processor 2501 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processor 2501 may include multiple central processing units (CPUs).

In the example, input/output interface 2505 may be configured to provide an interface or interfaces to an input/output device(s) 2506, such as a screen, keyboard, indicator light, keypad, touchscreen, or other input or output device. Other examples of an output device include a speaker, a sound card, a video card, a display, a monitor, a printer, an actuator, an emitter, a smartcard, another output device, or any combination thereof. An input device may allow a user to capture information into system 2500. Other examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2513 is structured as a battery or battery pack. Other types of power sources, such as an external power source (e.g., an electricity outlet), photovoltaic device, or power cell, may be used. The power source 2513 may further include power circuitry for delivering power from the power source 2513 itself, and/or an external power source, to the various parts of computing device 2500 via input circuitry or an interface such as an electrical power cable.

Memory 2515 may be configured to include memory such as random access memory (RAM) 2517, read-only memory (ROM) 2519, programmable read-only memory (PROM), erasable programmable read-only memory (EPROM), electrically erasable programmable read-only memory (EEPROM), magnetic disks, optical disks, hard disks, removable cartridges, flash drives, other storage medium 2521, and so forth. In one example, the memory 2515 includes one or more application programs 2525, an operating system 2523, web browser application, a widget, gadget engine, or other application, and corresponding data 2527. Memory 2515 may store, for use by the computing device 2500, any of a variety of various operating systems or combinations of operating systems. An article of manufacture, such as one including a simulation system or communication system may be tangibly embodied as or in memory 2515, which may be or comprise a device-readable storage medium.

Processor 2501 may be configured to communicate with an access network or other network using the RF interface 2509 or network connection interface 2511. The RF interface 2509 or network connection interface 2511 may comprise one or more communication subsystems and may include or be communicatively coupled to an antenna. In the illustrated embodiment, communication functions of the RF interface 2509 or network connection interface 2511 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof.

A possible method embodiment under the present disclosure is shown in FIG. 10. Method 2780 comprises a method performed by an inventory system for tracking inventory. Step 2781 is receiving a list of one or more tasks at one or more servers (or computing devices, such as computers, tablets, smartphones, etc.). Step 2782 is associating, by the one or more servers, each of the one or more tasks with a predicted one or more items out of a plurality of items in a repository. Step 2783 is receiving, at the repository, an identification of one or more smart retainers, each of the one or more smart retainers comprising one or more receptacles and a computing device. Step 2784 is assigning the predicted one or more items to the one or more smart retainers. Step 2785 is identifying, by the computing device, one or more locations in the plurality of receptacles associated with the predicted one or more items. Step 2786 is receiving, by the computing device, an identification of one or more users associated with the predicted one or more items. Step 2787 is permitting, by the computing device, access to the one or more locations in response to identifying the one or more users. Step 2788 is updating, by the computing device, a status of the predicted one or more items. Method 2780 can comprise a variety of additional, optional, or alternative steps.

Figure 11:
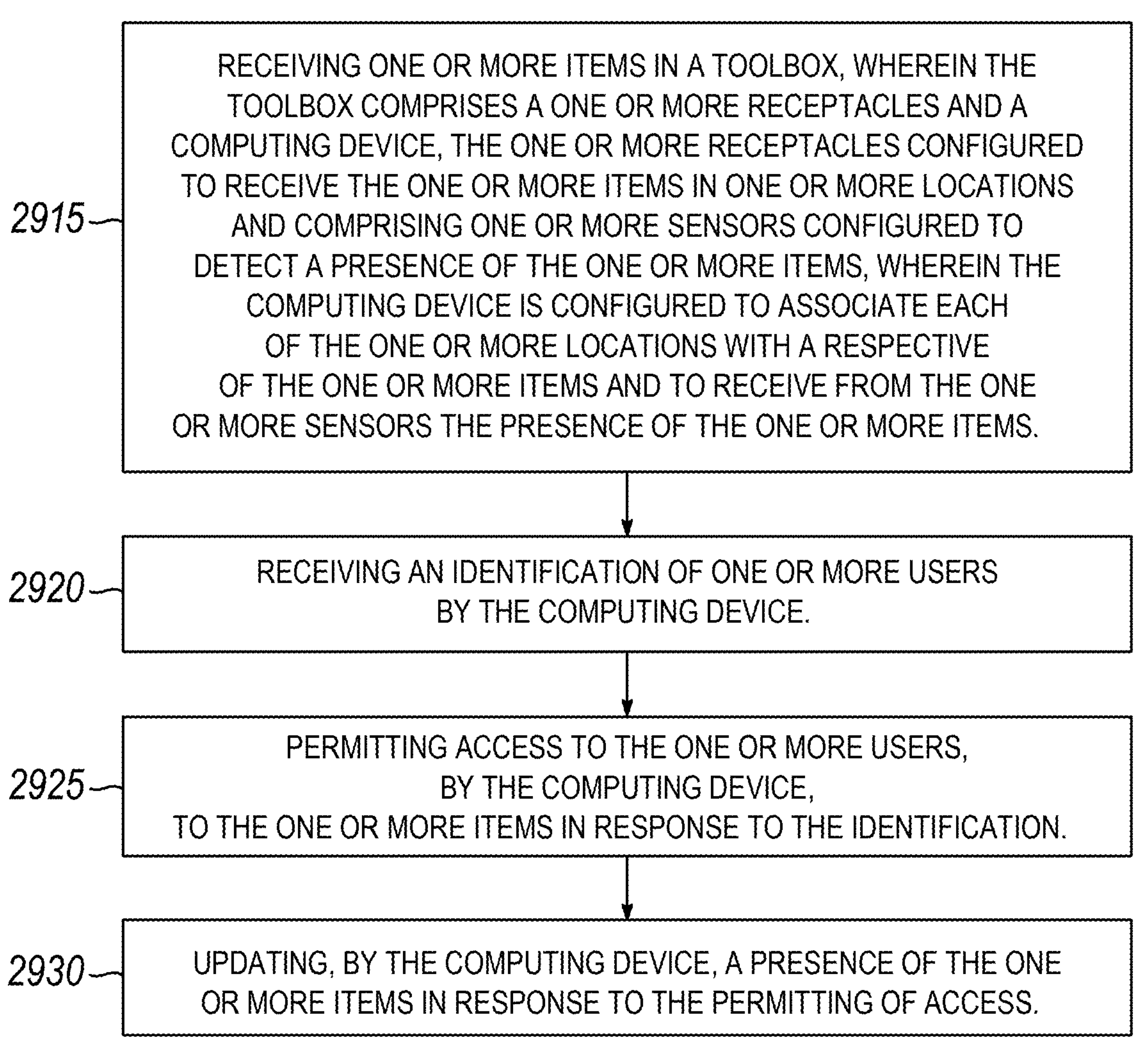
FIG. 11 illustrates a flow-chart of a method embodiment under the present disclosure.

Another possible method embodiment under the present disclosure is shown in FIG. 11. Method 2910 comprises a method performed by a toolbox for tracking inventory. Step 2915 is receiving one or more items in a toolbox, wherein the toolbox comprises one or more receptacles and a computing device, the one or more receptacles configured to receive the one or more items in one or more locations and comprising one or more sensors configured to detect a presence of the one or more items, wherein the computing device is configured to associate each of the one or more locations with a respective of the one or more items and to receive from the one or more sensors the presence of the one or more items. Step 2920 is receiving an identification of one or more users by the computing device. Step 2925 is permitting access to the one or more users, by the computing device, to the one or more items in response to the identification. Step 2930 is updating, by the computing device, a presence of the one or more items in response to the permitting of access. Method 2910 can comprise a variety of additional, optional, or alternative steps.

Figure 12:
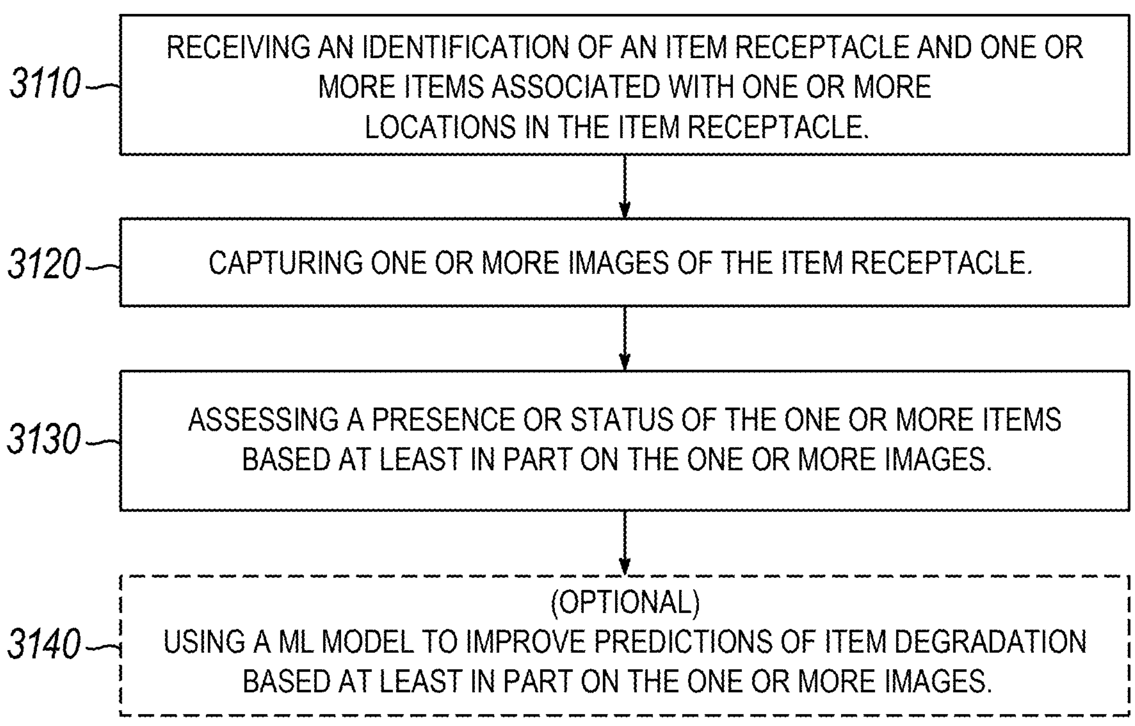
FIG. 12 illustrates a flow-chart of a method embodiment under the present disclosure.

Another possible method embodiment under the present disclosure is shown in FIG. 12. Method 3100 comprises a method performed by a scanning system for managing inventory. Step 3110 is receiving an identification of an item receptacle and one or more items associated with one or more locations in the item receptacle. Step 3120 is capturing one or more images of the item receptacle. Step 3130 is assessing a presence or status of the one or more items based at least in part on the one or more images. Step 3140, optional, is using a ML model to improve predictions of item degradation based at least in part on the one or more images. Method 3100 can comprise multiple variations and additional, optional, and/or alternative steps.

Figure 13:
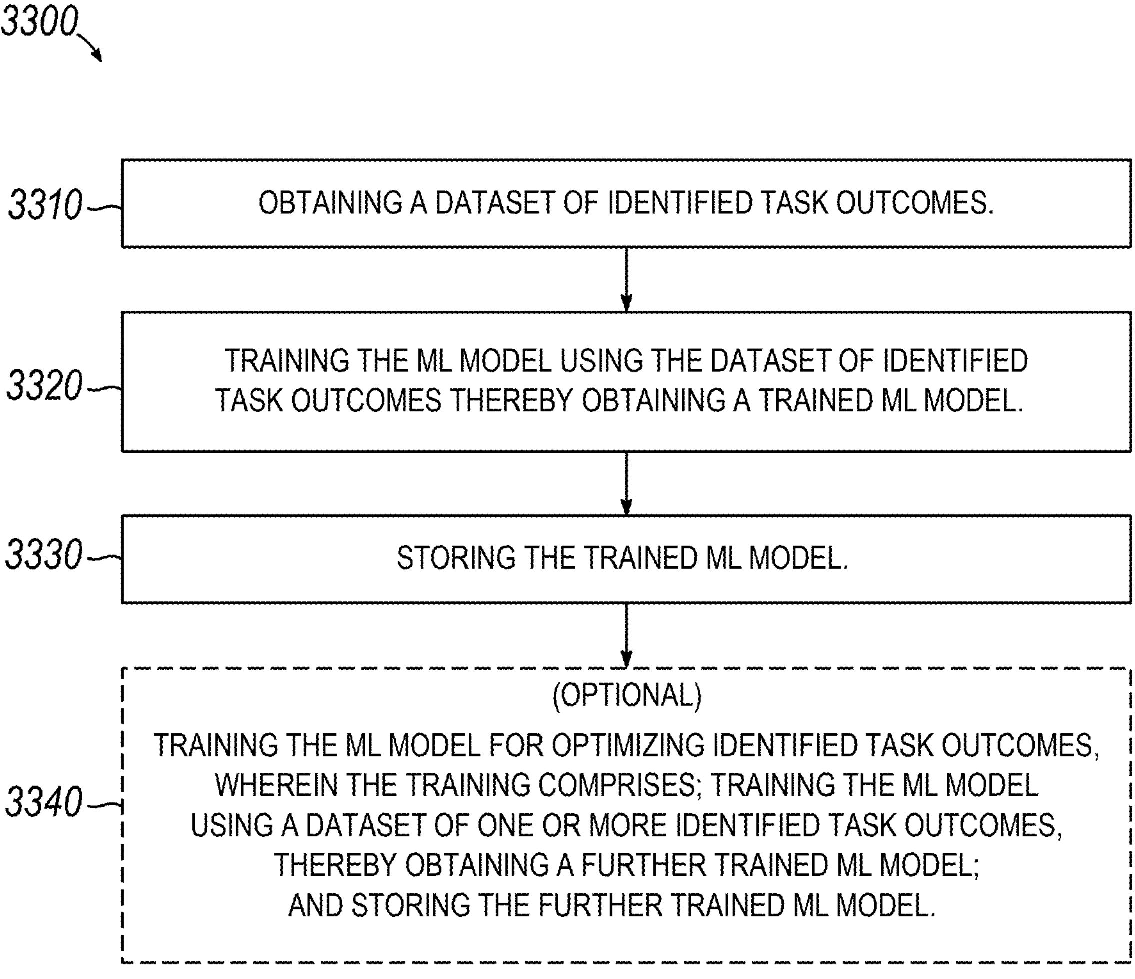
FIG. 13 illustrates a flow-chart of a method embodiment under the present disclosure.

Another possible method embodiment under the present disclosure is shown in FIG. 13. Method 3300 comprises a computer implemented method for training a ML model for optimizing item use predictions for identified tasks. Step 3310 is obtaining a dataset of identified task outcomes. Step 3320 is training the ML model using the dataset of identified task outcomes thereby obtaining a trained ML model. Step 3330 is storing the trained ML model. Step 3340, optional, is training the ML model for optimizing identified task outcomes, wherein the training comprises; training the ML model using a dataset of one or more identified task outcomes, thereby obtaining a further trained ML model; and storing the further trained ML model. Method 3300 can comprise a variety of additional, optional, or alternative steps or variations. For example, in some variations the one or more identified task outcomes can comprise one or more of: annual supply costs; annual tools lost; annual personnel costs; one or more items associated with an identified task; optimal tool and/or item placement within a container; mission readiness; tool/vehicle availability; speed of repair; calibration of a given tool or other repair down time; transparent chain of custody; or other outcomes that may be valuable for operation of a tool inventory system. In some variations the ML model uses one or more inputs comprising one or more of: one or more tool names; number of repair workers; location weather; location altitude; annual tool costs; number of one or more tools associated with an identified task; one or more identified tasks.

Figure 14:
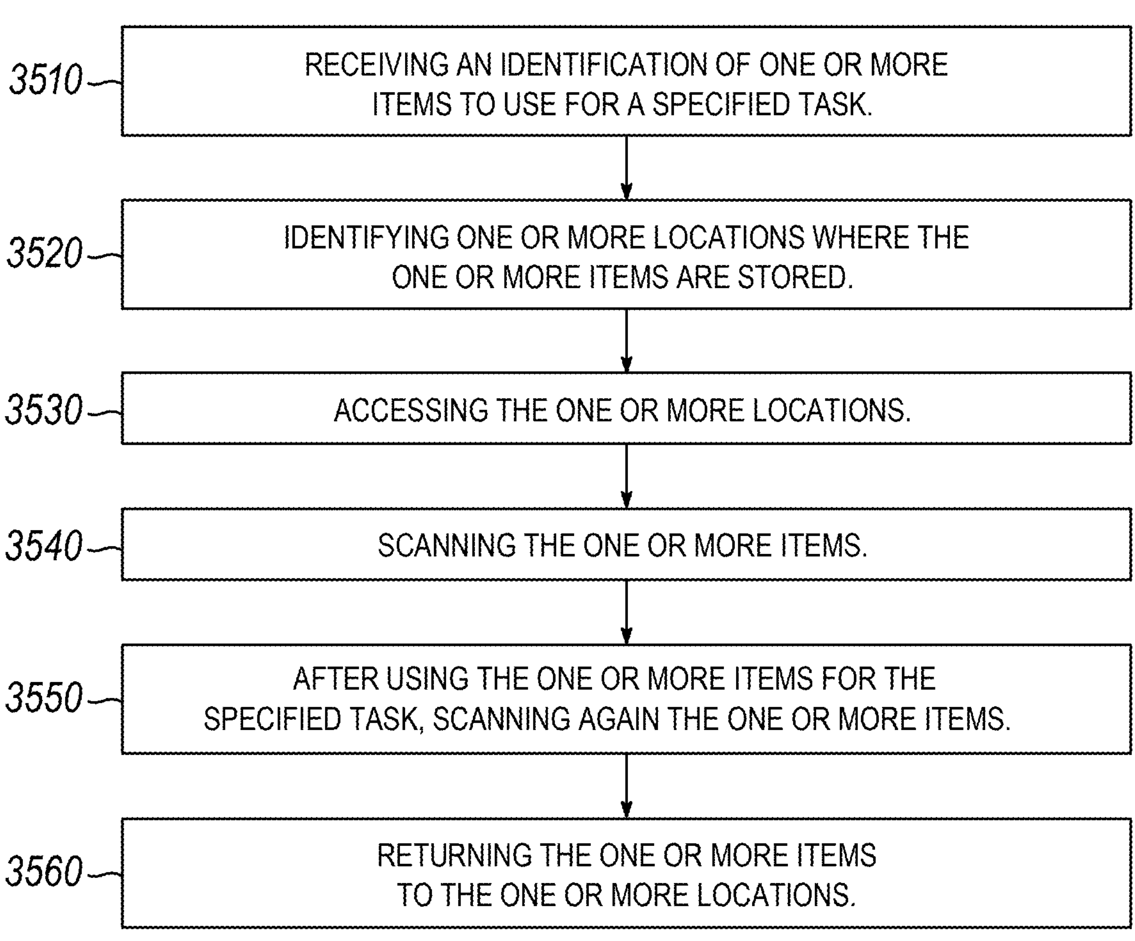
FIG. 14 illustrates a flow-chart of a method embodiment under the present disclosure.

Another possible method embodiment under the present disclosure is illustrated in FIG. 14. Method 3500 comprises a method of checking out items, supplies, vehicles, tools, or other objects. Step 3510 is receiving an identification of one or more items to use for a specified task. Step 3520 is identifying one or more locations where the one or more items are stored. Step 3530 is accessing the one or more locations. Step 3540 is scanning the one or more items. Step 3550 is, after using the one or more items for the specified task, scanning again the one or more items. Step 3560 is returning the one or more items to the one or more locations. Method 3500 can comprise a variety of additional, alternative, or optional steps or variations. For example, the identification can be received via a tablet, physical paper list, or other means. In another example, the one or more locations could be located in a smart tool retainer, a tool repository, a toolbox, or other receptacle. In some variations, the accessing the one or more locations can comprise unlocking a receptacle. In some variations, the scanning and/or scanning again can comprise at least one of: scanning an RFID tag, scanning a QR code, scanning a user RFID tag, performing a Bluetooth-based scan, performing an IR-based scan, taking a picture with a tablet or other smart device, or other means. In some variations, the scanning and/or scanning again can comprise at least one of: scanning with a user's scanner, or scanning with a scanner associated with a smart tool retainer.

Although the computing devices described herein (e.g., tablets, computers, servers, databases, smartphones, etc.) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to stored information, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In general, the various exemplary embodiments may be implemented in hardware or special purpose chips, circuits, software, logic, or any combination thereof. For example, some aspects may be implemented in hardware, while other aspects may be implemented in firmware or software which may be executed by a controller, microprocessor, or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Conclusion

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by certain embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A system for managing inventory, the system comprising:

an item repository comprising a first computing device, the item repository configured to store a plurality of items;

one or more smart retainers comprising a first plurality of receptacles and a second computing device, the second computing device configured to lock and unlock the first plurality of receptacles, the first plurality of receptacles configured to house one or more items of the plurality of items, wherein the second computing device is configured to detect where the one or more items are located within the first plurality of receptacles, the second computing device further configured to allow one or more users to check out the one or more items;

one or more toolboxes comprising a second plurality of receptacles and a third computing device, the second plurality of receptacles configured to house at least one item of the plurality of items, wherein the third computing device is configured to detect where the at least one item is located within the second plurality of receptacles, the third computing device further configured to allow the one or more users to check out the at least one item;

a smart device comprising a camera and configured to receive an identification of the one or more items and their location within the first plurality of receptacles and an identification of the at least one item and their location within the second plurality of receptacles, the smart device configured to be manipulated by the one or more users to capture an image of any of the first plurality of receptacles or the second plurality of receptacles and to determine if the one or more items and the at least one item is located in their respective locations; and one or more servers configured to receive a task identification from the one or more users and to identify one or more necessary items of the plurality of items that are predicted to be used for the identified task and to allow one or more users associated with the task to check out the one or more necessary items, the one or more servers further configured to use a machine learning model to improve predictions of the one or more necessary items.

2. The system of claim 1, wherein the second computing device is configured to report a status of the one or more of the plurality of items to the one or more servers.

3. The system of claim 1, wherein the third computing device is configured to report a status of the at least one of the plurality of items to the one or more servers.

4. The system of claim 1, wherein the smart device is further configured to assess a degradation of the one or more items or the at least one item.

5. The system of claim 1, wherein the one or more toolboxes comprise at least one cutout configured to receive the at least one item, wherein each of the at least one cutouts comprises a Radio Frequency Identification (RFID) tag such that if the at least one item is within the at least one cutout then a radio signal is interrupted such that a lack of the radio signal indicates the presence of the at least one item to the third computing device.

6. The system of claim 1, wherein the second computing device is configured to passively detect the presence of the one or more users.

7. The system of claim 1, further comprising one or more scanners configured to scan the plurality of items and to be coupled communicatively to the first, second, or third computing device.

8. The system of claim 7, wherein the one or more scanners are configured to scan one or more Radio Frequency Identification (RFID) tags comprising the plurality of items.

9. The system of claim 7, wherein the one or more scanners are configured to have at least one of: a persistent connection to the first, second, or third computing device; an intermittent connection to the first, second, or third computing device.

* * * * *